US007565968B2

(12) United States Patent
Lindley

(10) Patent No.: US 7,565,968 B2
(45) Date of Patent: Jul. 28, 2009

(54) PORTABLE SURVIVAL KIT

(76) Inventor: Michael B. Lindley, 7 Moet Ct., Rancho Mirage, CA (US) 92270

( * ) Notice: Subject to any disclaimer, the term of this patent is extended or adjusted under 35 U.S.C. 154(b) by 73 days.

(21) Appl. No.: 11/716,997

(22) Filed: Mar. 12, 2007

(65) Prior Publication Data

US 2007/0221515 A1 Sep. 27, 2007

Related U.S. Application Data

(60) Provisional application No. 60/767,228, filed on Mar. 13, 2006.

(51) Int. Cl.
*B65D 71/00* (2006.01)
*B65D 81/32* (2006.01)
*H01M 10/44* (2006.01)

(52) U.S. Cl. ........................ 206/223; 426/115; 320/101

(58) Field of Classification Search ................. 363/108; 429/92, 97, 100, 150, 163; 206/223; 426/115; 307/150; 323/299, 906; 320/101
See application file for complete search history.

(56) References Cited

U.S. PATENT DOCUMENTS

| | | | | |
|---|---|---|---|---|
| 360,934 | A | 4/1887 | Waite | |
| 2,230,458 | A | 2/1941 | Hummert | |
| 2,274,285 | A * | 2/1942 | Walker | 219/387 |
| 2,765,133 | A * | 10/1956 | Antonidis | 248/645 |
| 3,094,439 | A | 6/1963 | Mann et al. | |
| 3,376,164 | A | 4/1968 | Bachwansky | |
| 3,963,972 | A | 6/1976 | Todd | |
| 4,122,396 | A | 10/1978 | Grazier et al. | |
| 4,209,346 | A | 6/1980 | King | |
| 4,300,087 | A | 11/1981 | Meisner et al. | |
| 4,376,250 | A | 3/1983 | Baker, Jr. et al. | |
| 4,421,943 | A | 12/1983 | Withjack | |
| 4,648,013 | A | 3/1987 | Curiel | |
| 4,686,441 | A | 8/1987 | Petterson | |
| 4,740,431 | A | 4/1988 | Little | |
| 4,808,904 | A | 2/1989 | Ricaud et al. | |
| 5,039,928 | A | 8/1991 | Nishi et al. | |
| 5,082,505 | A | 1/1992 | Cota et al. | |
| 5,111,127 | A * | 5/1992 | Johnson | 320/101 |
| 5,225,003 | A | 7/1993 | Ming-Che et al. | |
| 5,260,885 | A | 11/1993 | Ma et al. | |
| 5,379,596 | A | 1/1995 | Grayson | |
| 5,387,858 | A | 2/1995 | Bender et al. | |
| 5,500,052 | A | 3/1996 | Horiuchi et al. | |
| 5,515,974 | A | 5/1996 | Higson | |
| 5,522,943 | A | 6/1996 | Spencer et al. | |
| 5,605,769 | A | 2/1997 | Toms | |
| 5,644,207 | A | 7/1997 | Lew et al. | |
| 5,644,294 | A | 7/1997 | Ness | |
| 5,660,643 | A | 8/1997 | Toggweiler et al. | |

(Continued)

*Primary Examiner*—Akm E Ullah
*Assistant Examiner*—M'Baye Diao
(74) *Attorney, Agent, or Firm*—Lerner, David, Littenberg, Krumholz & Mentlik, LLP

(57) ABSTRACT

A portable survival kit includes a housing defining an internal compartment. One or more rechargeable energy sources are inside the compartment. One or more electrical generators are associated with the housing. Each electrical generator is adapted to facilitate charging of at least one of the rechargeable energy sources. One or more electrical elements are associated with the housing and each electrical element is adapted to receive electrical energy from at least one of the rechargeable energy sources. Also, a source of edible human nourishment is stored inside the compartment.

24 Claims, 11 Drawing Sheets

U.S. PATENT DOCUMENTS

| | | | |
|---|---|---|---|
| 5,692,647 | A | 12/1997 | Brodie |
| 5,701,067 | A | 12/1997 | Kaji et al. |
| 5,713,655 | A | 2/1998 | Blackman |
| 5,714,869 | A | 2/1998 | Tamechika et al. |
| 5,925,942 | A | 7/1999 | Theobald |
| 5,969,501 | A | 10/1999 | Glidden et al. |
| 5,977,659 | A | 11/1999 | Takehara et al. |
| 6,034,443 | A | 3/2000 | Oliemuller et al. |
| 6,041,242 | A | 3/2000 | Coulthard |
| 6,046,400 | A | 4/2000 | Drummer |
| D425,018 | S | 5/2000 | Madura et al. |
| 6,326,764 | B1 * | 12/2001 | Virtudes .................... 320/101 |
| 6,376,764 | B1 | 4/2002 | Luo et al. |
| 6,396,239 | B1 | 5/2002 | Benn et al. |
| 6,404,620 | B1 | 6/2002 | Piccione |
| 6,448,489 | B2 | 9/2002 | Kimura et al. |
| 6,476,311 | B1 | 11/2002 | Lee et al. |
| 6,479,743 | B2 | 11/2002 | Vaz et al. |
| 6,538,341 | B1 | 3/2003 | Lang et al. |
| 6,593,521 | B2 | 7/2003 | Kobayashi et al. |
| 6,610,919 | B2 | 8/2003 | Ohkubo et al. |
| 6,686,533 | B2 | 2/2004 | Baum et al. |
| 6,686,534 | B2 | 2/2004 | Chen |
| 6,689,507 | B1 | 2/2004 | Tsutsumi et al. |
| 6,737,573 | B2 | 5/2004 | Yeh et al. |
| 6,774,299 | B2 | 8/2004 | Ford |
| 6,812,396 | B2 | 11/2004 | Makita et al. |
| 6,847,130 | B1 | 1/2005 | Belehradek et al. |
| 6,884,934 | B2 | 4/2005 | Tsuzuki et al. |
| 6,894,439 | B2 | 5/2005 | Stewart et al. |
| 6,914,340 | B2 | 7/2005 | Becker et al. |
| 6,917,188 | B2 | 7/2005 | Kernahan |
| 6,930,237 | B2 | 8/2005 | Mattiuzzo et al. |
| 6,930,403 | B2 | 8/2005 | Hartman et al. |
| 6,949,843 | B2 | 9/2005 | Dubovsky |
| 2002/0047627 | A1 | 4/2002 | Pickering |
| 2002/0067143 | A1 | 6/2002 | Robinett et al. |
| 2002/0171391 | A1 | 11/2002 | Batts-Gowins |
| 2003/0160592 | A1 * | 8/2003 | Murakami et al. .......... 320/116 |
| 2003/0167105 | A1 | 9/2003 | Colborn |
| 2003/0214270 | A1 | 11/2003 | Shiue et al. |
| 2004/0207330 | A1 | 10/2004 | Ruffell et al. |
| 2004/0239287 | A1 | 12/2004 | Batts-Gowins |
| 2005/0062456 | A1 | 3/2005 | Stone et al. |
| 2005/0142929 | A1 | 6/2005 | Cottle |
| 2005/0157482 | A1 | 7/2005 | Hsu |
| 2005/0213272 | A1 | 9/2005 | Kobayashi |
| 2005/0218657 | A1 | 10/2005 | Weesner et al. |
| 2005/0231869 | A1 | 10/2005 | Yoshikawa et al. |
| 2005/0233189 | A1 | 10/2005 | Shioya |
| 2006/0238317 | A1 * | 10/2006 | Colledge .................... 340/431 |

* cited by examiner

PORTABLE SURVIVAL KIT

CROSS-REFERENCE TO RELATED APPLICATION(S)

This application claims the benefit of the filing date of U.S. Provisional Patent Application No. 60/767,228, filed Mar. 13, 2006, the disclosure of which is hereby incorporated herein by reference.

FIELD OF THE INVENTION

This invention relates generally to a survival kit and, more particularly, to a portable survival kit that is particularly well-suited to facilitate long-term survival under a variety of adverse circumstances.

BACKGROUND OF THE INVENTION

Unfortunately, a variety of emergency situations occur and often people find themselves unprepared to deal with such emergency situations. Those situations can leave people stranded, sometimes for extended periods of time, with little to no access to food, water, communication equipment and information about rescue efforts, etc. that might be underway.

Those emergency situations can arise, for example, as a result of severe flooding, earthquakes and terrorist activities. When such situations do arise, they can be very threatening and often the people that are subjected to such situations are ill-prepared to deal with the consequences.

SUMMARY OF THE INVENTION

In one aspect, a portable survival kit includes a housing defining an internal compartment. One or more rechargeable energy sources are inside the compartment. One or more electrical generators are associated with the housing. Each electrical generator is adapted to facilitate charging of at least one of the rechargeable energy sources. One or more electrical elements are associated with the housing and each electrical element is adapted to receive electrical energy from at least one of the rechargeable energy sources. Also, a source of edible human nourishment is stored inside the compartment.

In some embodiments, the housing is substantially water resistant and/or substantially water proof.

In a typical embodiment, the one or more electrical generators include a dynamo with a hand-operable mechanical actuator to facilitate inputting mechanical energy to the dynamo. The mechanical actuator typically is a cranking mechanism.

According to some embodiments, the one or more electrical generators include a plurality of solar cells, which, for example, can be formed on a flexible substrate that is foldable for storage inside the compartment. In some embodiments, the one or more electrical generators include a wind-operable generator. Typically, the wind-operable generator is storable within the compartment.

Certain embodiments of the survival kit include a power cord adapted for connection to a household power outlet. The power cord is adapted, when connected, to deliver charging current from the household power outlet to at least one of the rechargeable energy sources.

In some embodiments, a light is coupled to the housing and is adapted to illuminate upon failure of household power via the power cord. Typically, that light is exposed at an external surface of the housing.

The one or more electrical elements can include, for example, one or more cellular telephone charging ports, wireless communication devices, televisions, rechargeable flashlights, fans, a D.C. outlets, A.C outlets, lights, etc, or any combination thereof. Typically, those elements are either inside or somehow associated with the housing of the kit.

According to certain embodiments, the one or more rechargeable energy sources include a first battery (e.g., a 3.6 volt battery pack) adapted to supply electrical energy to a first set of the electrical elements (e.g., a wireless communication device and a light) and a second battery (e.g., a 12 volt battery) adapted to supply electrical energy to a second set of the electrical elements (e.g., D.C. and A.C. electrical outlets). Typically, the first set of electrical elements includes electrical elements that are more critical to survival and long-term well-being of the person using the kit than the second set of electrical elements.

The source of edible human nourishment typically includes a food source and a water source. The amount of food and water in the source of edible human nourishment is typically adapted to provide a human with nourishment for a specific number of person-days (e.g., two person-days or six person-days or twelve person days). In some embodiments, the portable survival kit also includes medical and survival supplies inside the housing.

Certain embodiments of the portable survival kit include an instrument platform inside the housing. The instrument panel is adapted to facilitate a user's interaction with one or more of the electrical elements. The instrument platform is typically coupled to the housing by a hinged connection so that moving the instrument platform about the hinge uncovers a storage compartment for the source of edible human nourishment beneath the instrument platform.

In some embodiments, the housing includes a body portion and a cover portion coupled to the body portion. The cover portion typically can be opened to provide access into the compartment. Moreover, the body portion and the cover are adapted to mate with each other in a manner that seals the compartment.

Certain embodiments of the portable survival kit include wheels coupled to the housing and a telescoping handle coupled to the housing.

In another aspect, a portable survival kit includes a substantially water-resistant housing that defines an internal compartment. First and second rechargeable energy sources are inside the compartment. A dynamo is associated with the housing and has a hand-operable mechanical actuator to facilitate inputting mechanical energy to the dynamo. The dynamo is adapted to facilitate charging of the first rechargeable energy source. Solar cells are formed on a flexible substrate that is foldable for storage inside the compartment. The solar cells are adapted to facilitate charging of the second rechargeable energy source. A first set of electrical elements is associated with the housing and is adapted to receive electrical energy from at least the first rechargeable energy source. A second set of electrical elements is associated with the housing and is adapted to receive electrical energy from at least the second rechargeable energy source. A source of edible nourishment is inside the compartment and is adapted to provide a human with nourishment for a specific number of person-days.

According to some embodiments, the first set of electrical elements includes a wireless communication device and a light and the second set of electrical elements includes D.C. and A.C. electrical outlets. Additionally, some embodiments include a power cord that is adapted for connection to a household power outlet and adapted, when connected to a household power outlet, to deliver charging current from the household power outlet to the second rechargeable energy source. Moreover, some embodiments include a light coupled to the housing, where the light is adapted to illuminate upon failure of household power via the power cord.

In some embodiments, one or more of the following advantages are present.

A portable survival kit is provided that includes a source of emergency food and water, key telecommunication and information accessing equipment, an electrical energy source for that equipment and a means for maintaining or replenishing the charge on those electrical energy sources. Since the charge on the energy sources can be replenished, access to the equipment (e.g., phones, radios, walkie-talkies, etc.) is maintained for an extended period of time—indeed, far longer than would otherwise be available simply with battery powered equipment. Moreover, since the food and water supply are included in the kit, the person using the kit will have energy and be able to live for far longer than they otherwise would have been able to live. Including all of these features in a compact, waterproof housing makes them readily available and likely to survive otherwise potentially damaging events, such as earthquakes, floods, etc. Providing means to maintain the charge on the energy sources from a household outlet ensures that the kits will be ready for use whenever they are needed. Also, having a power failure light exposed on an outer surface of the housing makes it easier to find the kit in the event of a blackout, which would normally accompany a serious flood or an earthquake.

Other features and advantages will be apparent from the following descriptions, claims and the drawings.

BRIEF DESCRIPTION OF THE DRAWINGS

Like reference numerals refer to like elements.

DETAILED DESCRIPTION OF THE DRAWINGS

Figure 1A:
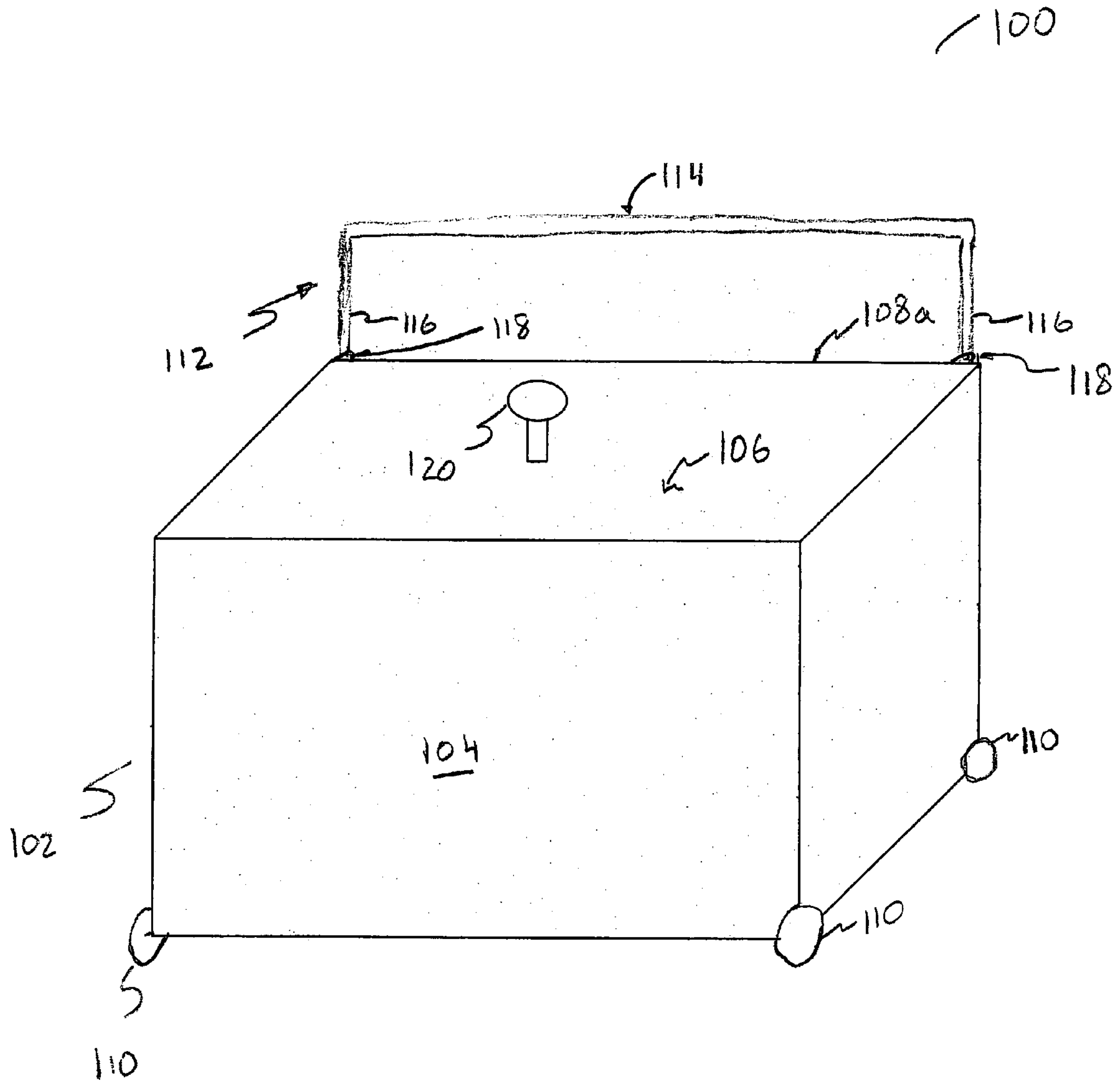
FIG. 1A is a perspective view of a portable survival kit.

FIG. 1A is a perspective view of a portable survival kit 100 that, in general, stores a variety of items that are particularly suited to help a person to survive for an extended period of time in emergency situations, such as extreme floods, earthquakes, etc.

The illustrated kit 100 includes a housing 102 with a body portion 104 and a cover 106. The body portion 104 and the cover 106 typically are made of a substantially rigid material, such as molded plastic. In the illustrated embodiment, body portion 104 and the cover 106 are secured together via a first hinged connection 108*a* so that the cover 106 can be swung open to expose a compartment inside the housing 102. The cover 106 mates with the body portion 104 in a manner such that the internal compartment is sealed in at least a substantially water-resistant manner. However, more preferably, the internal compartment is sealed in a substantially water-tight manner.

The illustrated kit 100 includes wheels 110 that facilitate its portability. More particularly, the wheels 110 enable a user to roll the kit around. The illustrated embodiment has four wheels 110. However, it should be understood that other embodiments could include more or less wheels 110 than shown. Indeed, in certain embodiments, particularly if the weight of the kit 100 is low, the wheels 110 may be omitted altogether.

The illustrated kit 100 also includes a telescoping handle 112. The telescoping handle 112 has a pair of extension bars 116 and a gripping portion 114 that spans between the distal ends of each extension bar 116. The extension bars 116 mates with respective sleeves 118 formed in the housing 102 and are movable in an axial direction within those sleeves 118. Accordingly, the telescoping handle 112 can be moved between a fully extended position with the extension bars 116 fully extended from their respective sleeves 118 and a fully retracted position with the extension bars 116 fully nestled within their respective sleeves 118. With the telescoping handle 112 in the fully extended position, a user can easily grip the gripping portion 114 and direct movement of the kit 100. Otherwise, the telescoping handle 112 can be stowed in the fully retracted position for storing.

As discussed in further detail below, the illustrated kit 100 includes one or more rechargeable energy sources (not visible in FIG. 1A), such as batteries. An electrical power cord 122 is provided that can be plugged into an ordinary household electrical outlet. When plugged into such an outlet, the electrical power cord 122 delivers energy sufficient to maintain a charge on at least one of the rechargeable energy sources. The energy provided by the electrical power cord 122 may be used for other purposes as well.

A light 120 is exposed at an outer surface of the housing 102. In some embodiments, the light 120 is adapted to automatically illuminate upon failure of the electrical power source being provided via the electrical power cord 122. In such instances, illumination from the light 120 would help a user locate the kit 100, for example, in the event of a power failure. In some instances, the light 120 is hand-operable and can be turned on or off by simply manipulating a switch located, for example, inside the housing 102.

Figure 1B:
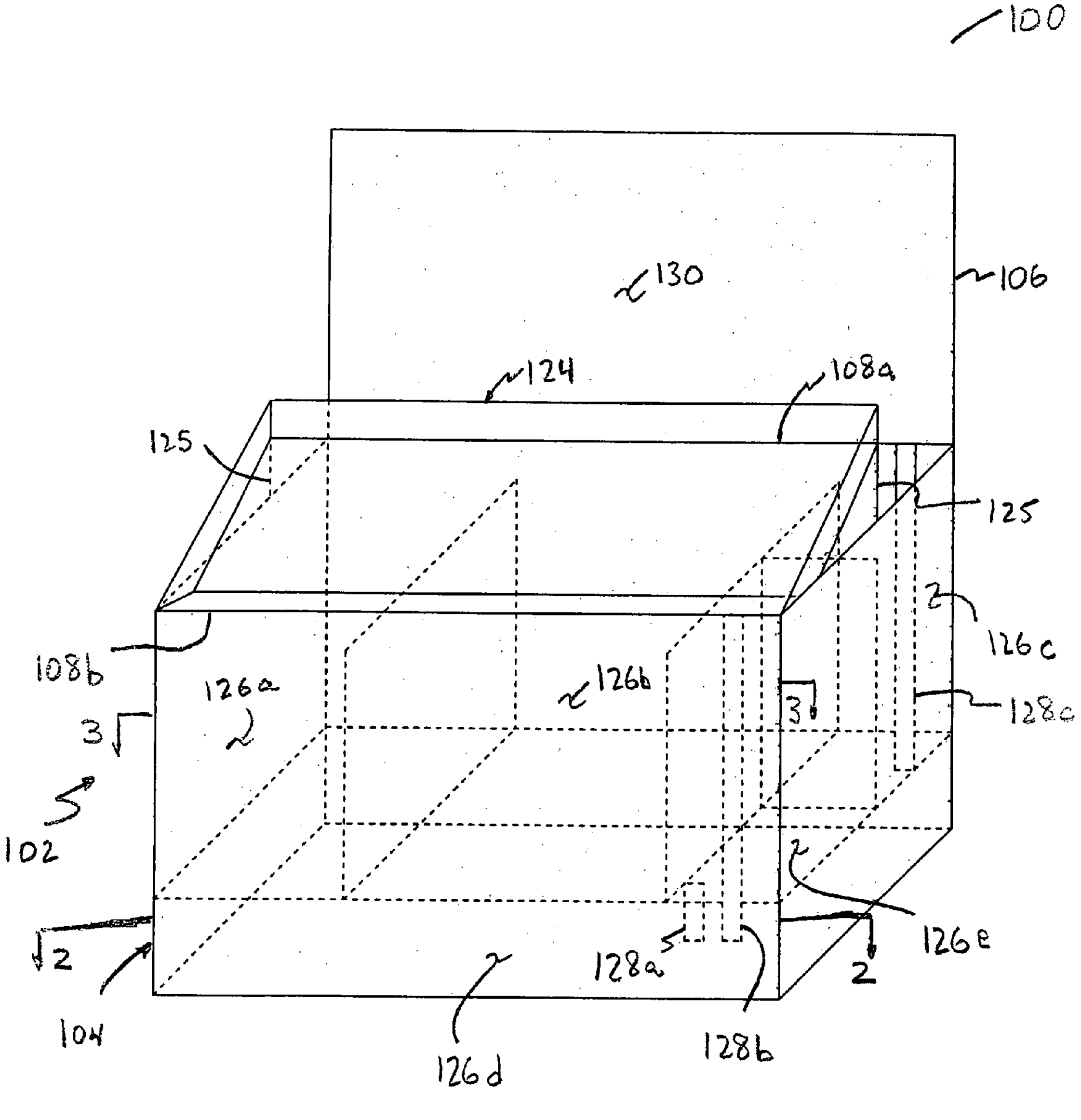
FIG. 1B is a cutaway perspective view of the survival kit of FIG. 1A with its cover in an open position.

FIG. 1B is a cutaway perspective view of the survival kit 100 of FIG. 1A with its cover 106 in an open position relative to the body portion 104.

An instrument panel 124 is coupled at a proximal edge thereof to an upper edge of the body portion 104 via a second hinged connection **108*b*. The second hinged connection 108*b* enables the instrument panel 124 to be moved so that its distal end can swing open, thereby uncovering a set of internal compartments below the instrument panel 124. In a typical embodiment, the second hinged connection 108*b* is adapted to allow the instrument panel 124 to be rotated at least ninety degrees up from a position that is substantially flat against the upper edges of the body portion 104**.

The instrument panel 124 typically is a rigid material such as a molded plastic and includes a number of electrical devices (e.g., a radio, electrical outlets, etc.) and, perhaps some non-electrical devices exposed at an upper surface thereof. Accordingly, a user is able to gain access to those devices by simply opening the cover 106.

In order to facilitate a user's interaction with the device(s) exposed at the upper surface of the instrument panel 124, the instrument panel 124 can be angled upward relative to the plane defined by the upper edges of the body portion 104 (as is shown). Toward that end, supports 125 are provided at opposite ends of the instrument panel 124, near a distal edge thereof. The supports 125 hang approximately downward from the instrument panel 124 and are adapted to engage a corresponding engagement feature (not shown in detail) near the upper edges of the body portion 104. With the supports 125 engaged in the corresponding engagement features, the instrument panel 124 can be maintained at an angled orientation.

The illustrated housing 102 has a set of internal walls that cooperatively define five discrete internal compartments: a food storage compartment **126*a*, a water storage compartment 126*b*, a survival equipment storage compartment 126*c*, a battery/electronics compartment 126*d* and an electrical charging element storage compartment 126*e*. Although a specific arrangement of compartments is shown, variations in the specific arrangement of compartments are possible. For example, in some embodiments, the housing 102 contains a greater number or a lesser number of compartments than are illustrated. Indeed, in one embodiment, the internal walls are excluded entirely and the housing 102**, therefore, includes only one internal compartment.

In a typical embodiment, the food storage compartment **126*a* includes a number of discretely packaged food items. Desirably, those food items have high nutritional value and a long shelf life. It is also desirable that the food items be substantially non-thirst provoking and include no ingredients that cause commonly known allergic reactions. Furthermore, it is desirable that the food items require no additional preparation prior to eating. Additionally, it is desirable that the packaging of the food items provide for efficient storing within the food storage compartment 126*a***.

In one example, each food item is an emergency food ration bar, such as The ER Bar™, which is available from Vita-Life Industries™, Inc. Of Moorpark, Calif. ER bars™ generally have high nutritional value, a shelf life of approximately five years, are substantially non-thirst provoking, have no ingredients that might cause dangerous allergic reactions and are ready to eat without additional preparation.

The water storage compartment **126*b* typically includes one or more water containers. The water desirably has a long shelf life, is purified and substantially bacteria free. Additionally, the water preferably is packaged in a manner that it can be efficiently stored within the water storage compartment 126*b***. In one example, the water containers are Aqua Blox® water containers, which are available from Aqua Blox®, LLC of West Palm Beach, Fla. An Aqua Blox® water container contains purified and substantially bacteria free drinking water with a United States Coast Guard approved five year shelf life. The water containers are aseptically packaged. Aqua Blox® water packages are available in 8.45 fluid ounce (250 ml) containers. Aqua Blox® water containers can withstand temperatures ranging from −22 to 150 degrees Fahrenheit. Furthermore, Aqua Blox® water containers are commercially sterile and, therefore, can be used as a wound cleanser or an eye wash. To use an Aqua Blox® water container in that manner, a user would simply insert a straw into the container and squeeze the container with sufficient pressure to eject a sterile water stream through the straw.

In a typical embodiment, the food storage compartment **126*a* and the water storage compartment 126*b* are respectively sized so as to accommodate an amount of food and/or water (i.e., the source of human nutrition) designed to last for a specified number of person-days (e.g., approximately six person-days). If, for example, the kit 100 were designed to provide a three-day source of nutrition for two people (i.e., six person-days), then the food storage compartment 126*a* might contain two packs of ER bars™, each pack containing six 400 calorie bars and the water storage compartment 126*b* might contain twelve 250 ml (8.45 oz.) Aqua Blox® containers of water. If two people used such a kit 100**, then each person would be able to eat two ER bars™ and drink two Aqua Blox® water containers each day, for three days.

The dimensions of each ER bar™ are approximately 6.25 inches by 4.5 inches by 1.375 inches. The dimensions of each Aqua Blox® container are approximately 4.25 inches by 2.625 inches by 1.75 inches. In the example under consideration, the food storage compartment **126*a* would be large enough to accommodate at least twelve such ER bars™ and the water storage compartment 126*b* would be large enough to accommodate at least twelve such Aqua Blox® containers. In order to maximize space usage, those compartments 126*a*, 126*b*** would not be sized any larger than that.

The survival equipment storage compartment **126*c*** typically includes a collection of medical and/or other survival items. In some embodiments, those items include first aid equipment, such as Band-Aids, aspirin, medicinal lotions, bandages, etc., blankets, matches, a compass, toiletries, such as a toothbrush, toothpaste, deodorant, etc.

The battery/electronics compartment **126*d* is located in the lower portion of the internal compartment of the housing 102. That compartment 126*d* typically includes one or more rechargeable energy sources (e.g., batteries) as well as other electronic/electrical equipment (e.g., battery charging circuits, etc.) discussed herein. The one or more rechargeable energy sources are adapted to provide electrical energy, for example, to the electrical devices that are exposed at the instrument panel 124. Typically, locating the battery/electronics compartment 126*d* in the lower portion of the housing 102 facilitates stability of the kit 100, because the heaviest items (e.g., the batteries) of the kit 100 are at the lowest part of the kit 100. Such an arrangement provides for a relatively low center of gravity for the kit 100 and, therefore, enhances the relative stability of the kit 100**.

The electrical charging element storage compartment **126*e* typically includes at least one element that is adapted to facilitate charging the one or more rechargeable energy sources (not shown in FIG. 1B) in the battery/electronics compartment 126*d*. In some embodiments, the electrical charging element is an electrical dynamo (not shown) with a hand operable cranking mechanism. In some embodiments, the electrical dynamo is secured in place inside the compartment 126*e*** with its hand operable crank mechanism facing upward to allow a user to manipulate the crank mechanism.

Alternatively, the electrical dynamo is adapted to be pulled out of the electrical charging element storage compartment 126*e* and placed on a surface next to the kit 100 for operation. Typically, the electrical dynamo is electrically coupled to the rechargeable energy sources in compartment 126*d* in such a manner as to facilitate charging of the rechargeable energy sources.

In some embodiments, the electrical charging element storage compartment 126*e* includes an electrical power cord that is coupled to the rechargeable energy source(s) at one end and has an electrical plug at the other end. The electrical plug is adapted to be plugged into a standard household outlet. By plugging the plug into such an outlet, household power can be provided via the electrical cord to the rechargeable energy sources for charging purposes.

In some embodiments, the electrical charging element storage compartment 126*e* includes other electrical charging elements. For example, in one embodiment, the electrical charging element storage compartment 126*e* accommodates a solar panel (not shown) having a number of solar cells positioned thereupon. Typically, the solar panel is adapted to be pulled out of the electrical charging element storage compartment 126*e* and placed on a surface next to the kit 100 for operation. Additionally, the solar panel is electrically coupled to the rechargeable energy sources in compartment 126*d* in such a manner as to facilitate charging of the rechargeable energy sources.

The exact position of the electrical charging element storage compartment 126*e* inside the housing 102 can vary considerably. However, typically that compartment 126*e* is arranged so that a user will have easy access to the recharging element(s) stored therein.

In a typical embodiment, the lower surface 130 of the cover 106 includes storage features (not shown) that enable stowing of a solar panel and at least a portion of its associated cabling. The solar panel may be foldable so that it can be stowed in a folded position. However, the solar panel may be secured to the lower surface 130 of the cover 106 in a non-folded manner. In that instance, the solar panel may be arranged so that it can be exposed to sunlight while stored in place on the lower surface 130 of the cover 106.

The illustrated kit 100 includes electrical cable routing channels 128*a*, 128*b* and 128*c* that provide routing paths for electrical cable(s) between the battery/electronics compartment 126*d* and, respectively, the electrical charging element storage compartment 126*e*, the instrument panel 124 and the cover 106. In a typical embodiment, one or more electrical cables are routed between the rechargeable energy source(s) in the battery/electronics compartment 126*d* and the electrical charging element(s) in the electrical charging element storage compartment 126*e* via the electrical cable routing channel 128*a*. Additionally, one or more electrical cables are routed between the rechargeable energy source(s) in the battery/electronics compartment 126*d* and the electrical elements exposed at the instrument panel 124 via the electrical cable routing channel 128*b*. Moreover, one or more electrical cables are routed between the rechargeable energy source(s) in the battery/electronics compartment 126*d* and the light 120 (see FIG. 1A) exposed at the cover 106 via the electrical cable routing channel 128*c*.

Figure 2:
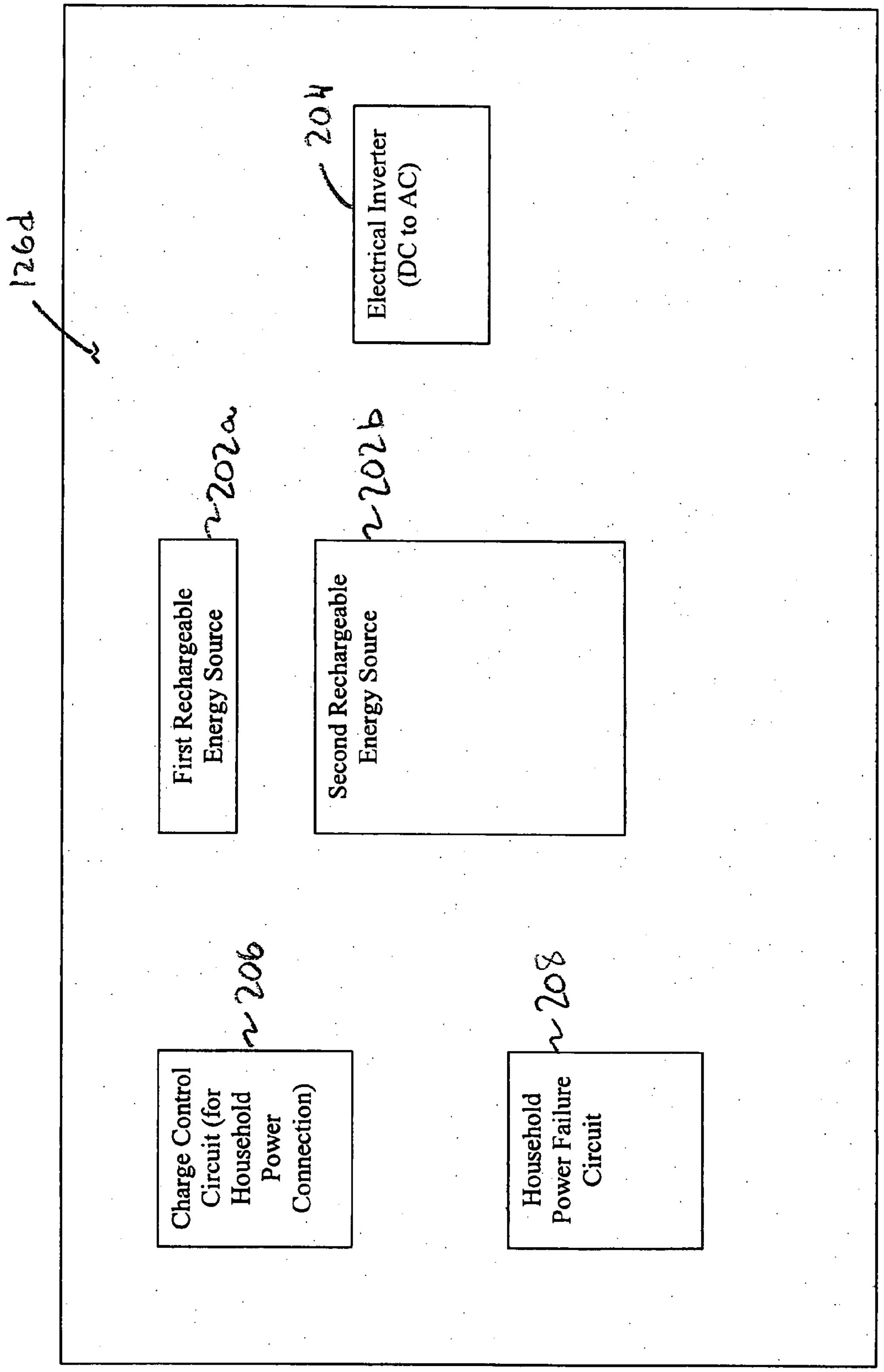
FIG. 2 is a cross-sectional view of the battery/electronics compartment of the survival kit taken across lines 2-2 in FIG. 1B.

FIG. 2 is a cross-sectional view of the battery/electronics compartment 126*d* of the survival kit 100 taken across lines 2-2 in FIG. 1B.

The illustrated compartment 126*d* includes a pair of rechargeable energy sources 202*a*, 202*b*. In the illustrated embodiment, the first rechargeable energy source 202*a* is a relatively low voltage battery source and the second rechargeable energy source 202*b* is a relatively higher voltage battery source. In some embodiments, the first rechargeable energy source 202*a* is a nickel metal hydride (NiMH) rechargeable battery pack having a direct current voltage rating of approximately 3.6 volt. Alternatively, the first rechargeable energy source 202*a* is a nickel cadmium (NiCd) rechargeable battery pack. In some embodiments, the second rechargeable energy source 202*b* is a lead acid battery with a direct current voltage rating of approximately 12 volt and an electrical storage capacity of approximately five (5) ampere-hours. Such a battery is available, for example, from Radio Shack® Corporation of Fort Worth, Tex.

In some embodiments, non-rechargeable alkaline, carbon zinc lithium, or manganese dioxide batteries can be used as either one, the other, or both of the first and second rechargeable energy sources. However, doing so would likely limit the length of time that electrical energy is available from the kit.

The illustrated compartment 126*d* also includes an electrical inverter 204, which is a device that converts direct current electricity (e.g., from one or both of the rechargeable energy sources 202*a*, 202*b*) to alternating current electricity. In some embodiments, the electrical inverter 204 is an XPower™ Pocket Inverter 100, available from Xantrex Technology, Inc. of Vancouver, British Columbia. The XPower™ Pocket Inverter 100 is a mini-inverter that utilizes electronics to convert 12 volt direct current battery power into 120 volt alternating current electricity.

A charge control circuit 206 (for the household power connection) is provided in compartment 126*d* as well. The charge control circuit 206 is adapted to convert household electrical power (supplied via electrical power cord 122, see FIG. 1) to a useable charging voltage (e.g., 12 volts DC) for at least one of the rechargeable energy sources 202*a*, 202*b*. In some embodiments, the charge control circuit 206 is a discrete circuit. In other embodiments, the charge control circuit 206 is implemented together with other circuitry associated with the kit 100.

The compartment 126*d* also includes a household power failure circuit 208. The household power failure circuit 208 is adapted to monitor the availability of household power via electrical power cord 122 and to cause illumination of light 120 upon failure of that monitored household power. In some embodiments, the household power failure circuit 208 is a discrete circuit. In other embodiments, the household power failure circuit 208 is implemented together with other circuitry associated with the kit 100.

Figure 3:
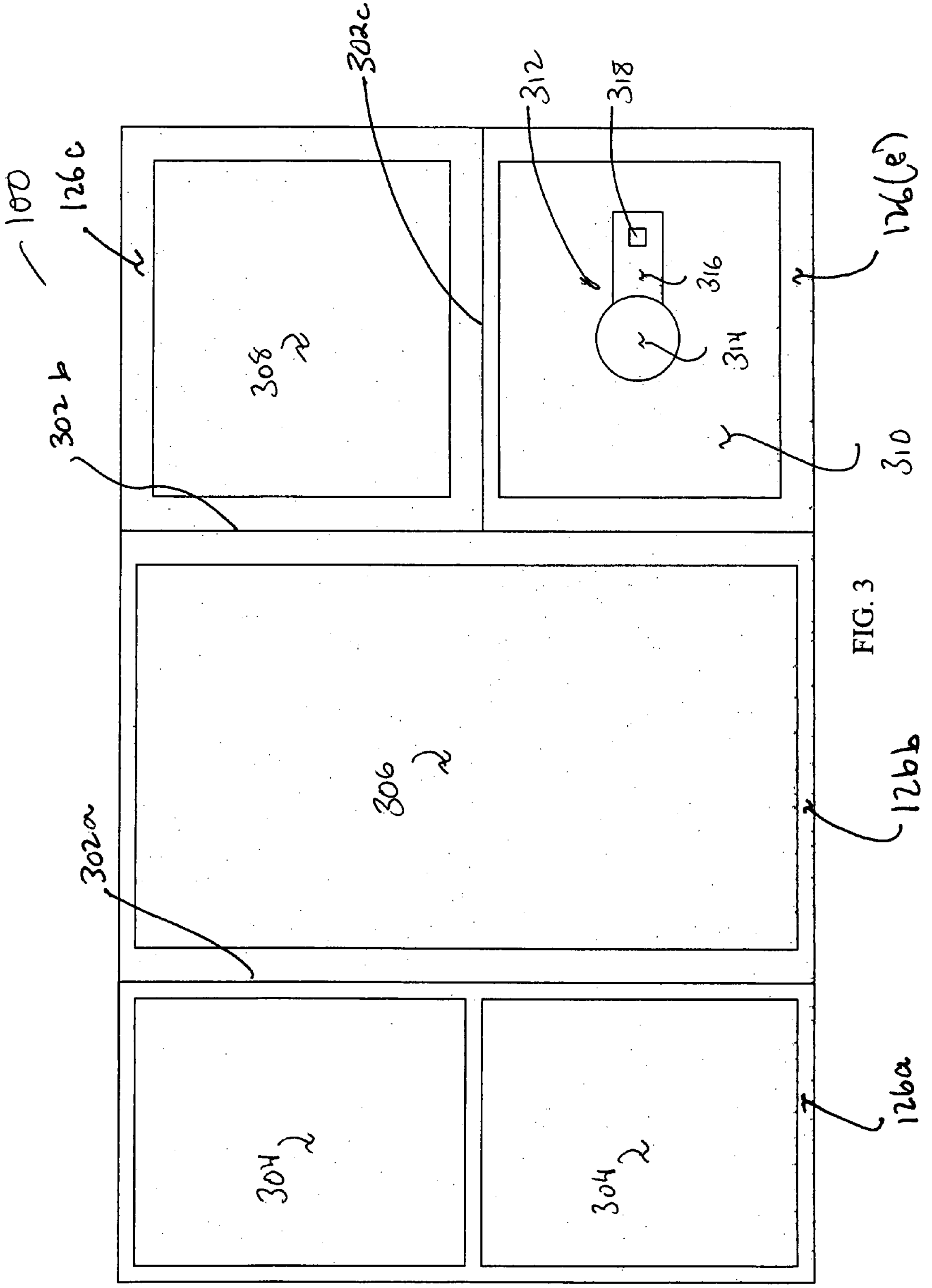
FIG. 3 is a cross-sectional view of the survival kit 100 taken across lines 3-3 in FIG. 1B.

FIG. 3 is a cross-sectional view of the survival kit 100 taken across lines 3-3 in FIG. 1B.

The illustrated survival kit 100 has a set of internal walls 302*a*, 302*b* and 302*c* that cooperatively define the following discrete internal compartments: a food storage compartment 126*a*, a water storage compartment 126*b*, a survival equipment storage compartment 126*c* and an electrical charging element storage compartment 126*e*. Although a specific arrangement of compartments is shown, variations in the specific arrangement of compartments are possible.

The illustrated food storage compartment 126*a* includes two boxes 304 of food items. Each box includes a plurality of individually wrapped food products. The illustrated water storage compartment 126*b* includes one box 306 containing a number of individually packaged water containers. The illustrated survival equipment storage compartment 126*c* includes one box 308 that includes a variety of survival equipment. The illustrated electrical charging element storage compartment 126*e* includes an electrical dynamo 310 with a hand-operable cranking mechanism 312 adapted for manipulation by a user.

The cranking mechanism 312 includes a rotatable center element 314, an arm 316 extending radially from the rotatable center element 314 and a gripping element 318 extending upward from and rotatably coupled to a distal end of the arm 316. The cranking mechanism 312 is adapted so that a user can grip the gripping element 318 and easily rotate the gripping element about the axis of the rotatable center element 314. By manipulating the cranking mechanism 312 in that manner, a user imparts mechanical energy into the dynamo for conversion into electrical energy.

The electrical dynamo 310 is electrically coupled to one or more of the rechargeable energy sources (in the compartment 126*d*) so that electricity generated by the electrical dynamo 310 can be used to maintain and/or restore a charge at one or more of the rechargeable energy source(s).

The illustrated electrical dynamo 310 is arranged in its compartment 126*e* in a manner that it can be operatively manipulated by a user while it is in place in its compartment 126*e*. However, in some embodiments, the electrical dynamo 310 is adapted so as to be removable from its compartment 126*e* and able to be placed on a surface outside and adjacent to the kit 100. In those instances, the cranking mechanism 312 might not be exposed for manipulation by a user while it is in place in its storage compartment 126*e*. Instead, in those instances, the electrical dynamo 310 would need to be removed from its compartment 126*e* in order to be operated.

Figure 4:
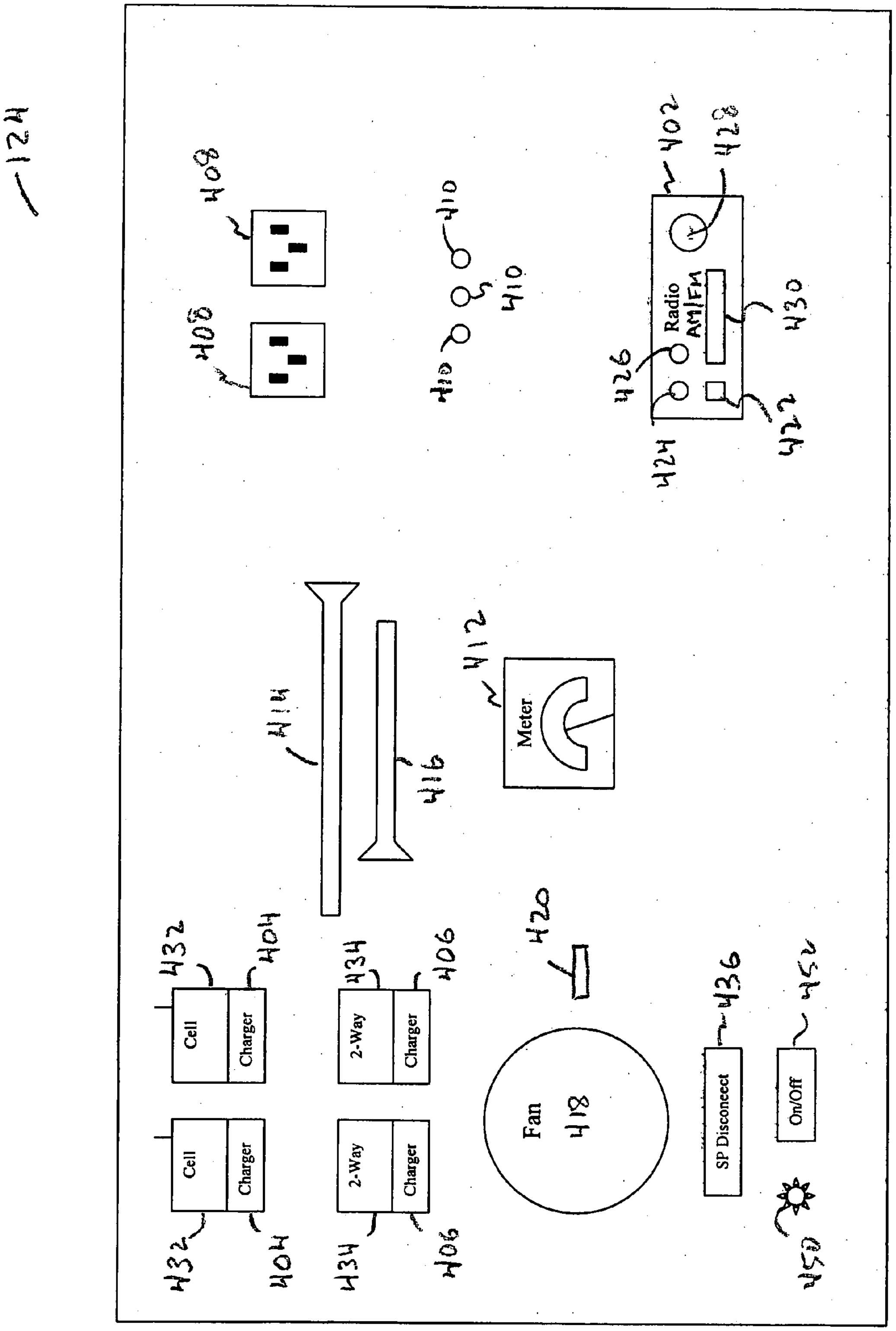
FIG. 4 is a plan view of the instrument panel 124 of the survival kit 100 in FIG. 1B.

FIG. 4 is a plan view of the instrument panel 124 of the survival kit 100 in FIG. 1B.

The illustrated instrument panel 124 is a substantially rigid, substantially planar platform, having a number of electrical elements exposed thereupon. Those elements include: a radio 402, wireless communication device charging ports (including a pair of cellular telephone charging ports 404 and two-way radio charging ports 406), a pair of alternating current electrical outlets 408, three direct current electrical outlets 410, a voltmeter 412 for one of the rechargeable energy sources, a relatively large rechargeable flashlight 414, a relatively small rechargeable flashlight 416, a fan 418 with an associated fan disconnect switch 420 and a solar panel disconnect switch 420.

In most embodiments, the radio 402 is a standard AM/FM radio receiver. As illustrated, the radio 402 includes a power switch 422, a volume knob 424, a frequency adjust knob, a speaker 428 and a frequency display 430. In some embodiments, the speaker 428 is a standard 1 inch diameter, 8 ohm, 0.5 watt audio speaker.

A pair of cellular telephones 432 is shown positioned in respective cellular telephone charging ports 404. The cellular telephones 432 are standard cellular telephones. Similarly, a pair of two-way radios 434 (e.g., walkie-talkies) is shown positioned in respective two-way radio charging ports. In general, a two-way radio is a radio that can both transmit and receive (i.e., a transceiver). A push-to-talk button is often present to activate the transmitter.

The AC and DC electrical outlets 408, 410 are standard electrical outlets and are adapted to be able to supply electrical power to any number of electrical devices that can be plugged in. Such electrical devices might include, for example, a television set, a laptop (or desktop computer), a small refrigerator, etc.

The illustrated embodiment includes a single voltmeter 412 that is adapted to display the voltage of at least one of the rechargeable energy sources (e.g., 202*a* or 202*b* see FIG. 2) in the kit 100. In some embodiments, a voltmeter is provided for each of the rechargeable energy sources in the kit 100.

In certain embodiments, the rechargeable energy sources in the kit 100 are adapted to deliver and/or maintain a charge at the rechargeable flashlights 414, 416. In other embodiments, the rechargeable flashlights 414, 416 are independently rechargeable. As an example, some flashlights have an electrical generator built into them. Dynamo-powered flashlights have a winding crank connected to a stepper motor that feeds several diode bridges with their outputs connected in parallel feeding a field effect transistor that charges a capacitor that connects to one or more LEDs. Other flashlights generate electricity using electromagnetic induction. Those flashlights use a strong permanent magnet that can freely slide up and down a tube, passing through a coil of wire as it does. Shaking such a flashlight charges a capacitor or a rechargeable battery within the flashlight to maintain charge or to recharge.

The fan 418 is provided to enable a user to ventilate a small space and to stay cool under high ambient temperature conditions. The fan 418 includes a disconnect switch 420 to enable a user to conserve energy when ventilation and/or cooling are not desired.

The illustrated instrument panel 124 also includes a solar panel disconnect switch 436. The solar panel disconnect switch is electrically connected between the solar panel (not visible) and one or more of the rechargeable energy sources (also not visible). The solar panel disconnect switch 436 enables a user to disconnect the solar panel from its associated rechargeable energy sources when the solar panel is not generating electricity. That is desirable because when a solar panel is not generating electricity, it could act as an electrical load on its associated electrical energy source and, possibly drain the associated electrical energy source of charge.

The illustrated instrument panel 124 also includes a light 450 and an associated light switch 452. The light 450 is adapted so that, when it is energized, it provides a sufficient amount of light across the instrument panel to enable a user to see the various elements exposed there. The light 450 can be turned on and off by manipulating the switch 452.

Figure 5:
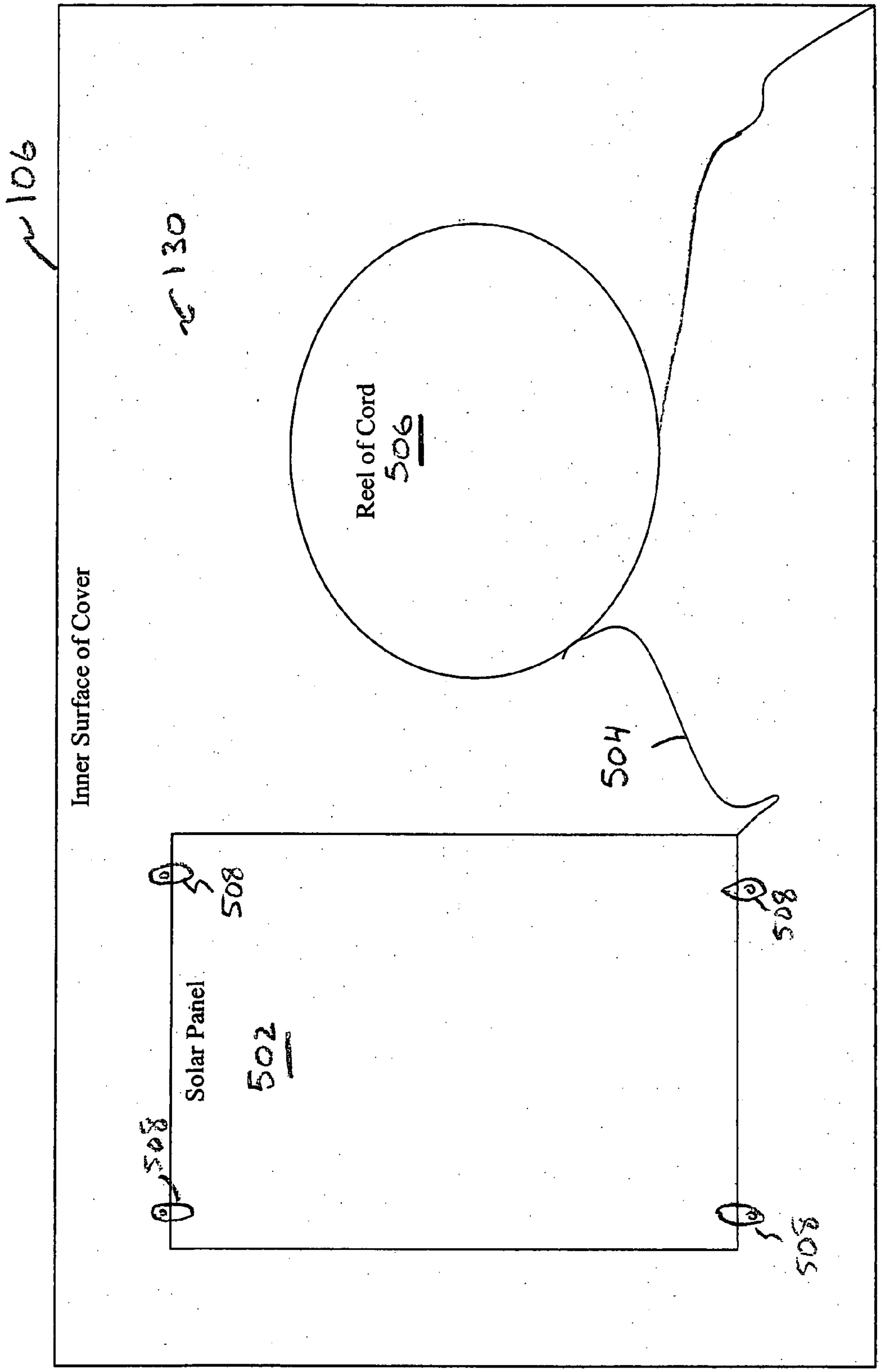
FIG. 5 is a schematic diagram of electrical circuitry associated with the survival kit of FIGS. 1A, 1B and 2-4.

FIG. 5 is a view of the inner surface 130 of the survival kit's cover 106.

As illustrated, a solar panel 502, having a plurality of solar cells positioned thereupon, is coupled to the inner surface 130. An electrical cord 504 extends from the solar panel 502 and is coupled to a reel 506 on the inner surface 130. The electrical cord 504 couples the solar panel 502 (via a solar panel disconnect switch, which is not shown in FIG. 5) to at least one of the rechargeable energy sources (i.e., 202*a* or 202*b*). The solar panel 502 is held in place against the inner surface 130 of the cover 106 by a set of fastening elements 508. In some embodiments, the solar panel 502 is stored in a folded position. However, in other embodiments, the solar panel 502 is stored in an unfolded position and arranged so that, when the cover 106 is open, the solar panel can be exposed to the sun's rays.

The solar panel 502 is desirably lightweight, flexible, foldable, durable, water resistant, and able to produce enough power in an efficient manner to maintain charge at and/or recharge a variety of rechargeable devices. Such rechargeable devices include, for example, flashlights, lanterns, cell phones, GPS units, satellite phones, MP3 players, laptop computers, etc. In most embodiments, the solar panel is capable of supplying at least 6.5 watts of power. In some embodiments, the solar panel is a SUNLINQ™ solar panel having PowerFLEX™ technology, available from Global Solar Energy, Inc. of Tucson, Ariz.

A reel 506 also is exposed at the inner surface 130 of the cover 106. The electrical cord 504 is coupled to the reel 506 in a manner that facilitates its unraveling. Accordingly, the solar panel can be removed from the inner surface 130 of the cover 106 and positioned at a location remote from the survival kit 100. With the solar panel 502 so positioned, the electrical cord 504 couples the solar panel 502 to the kit 100. More particularly, the electrical cord 504 couples the solar panel to the rechargeable energy source associated with the solar panel.

Figure 6:
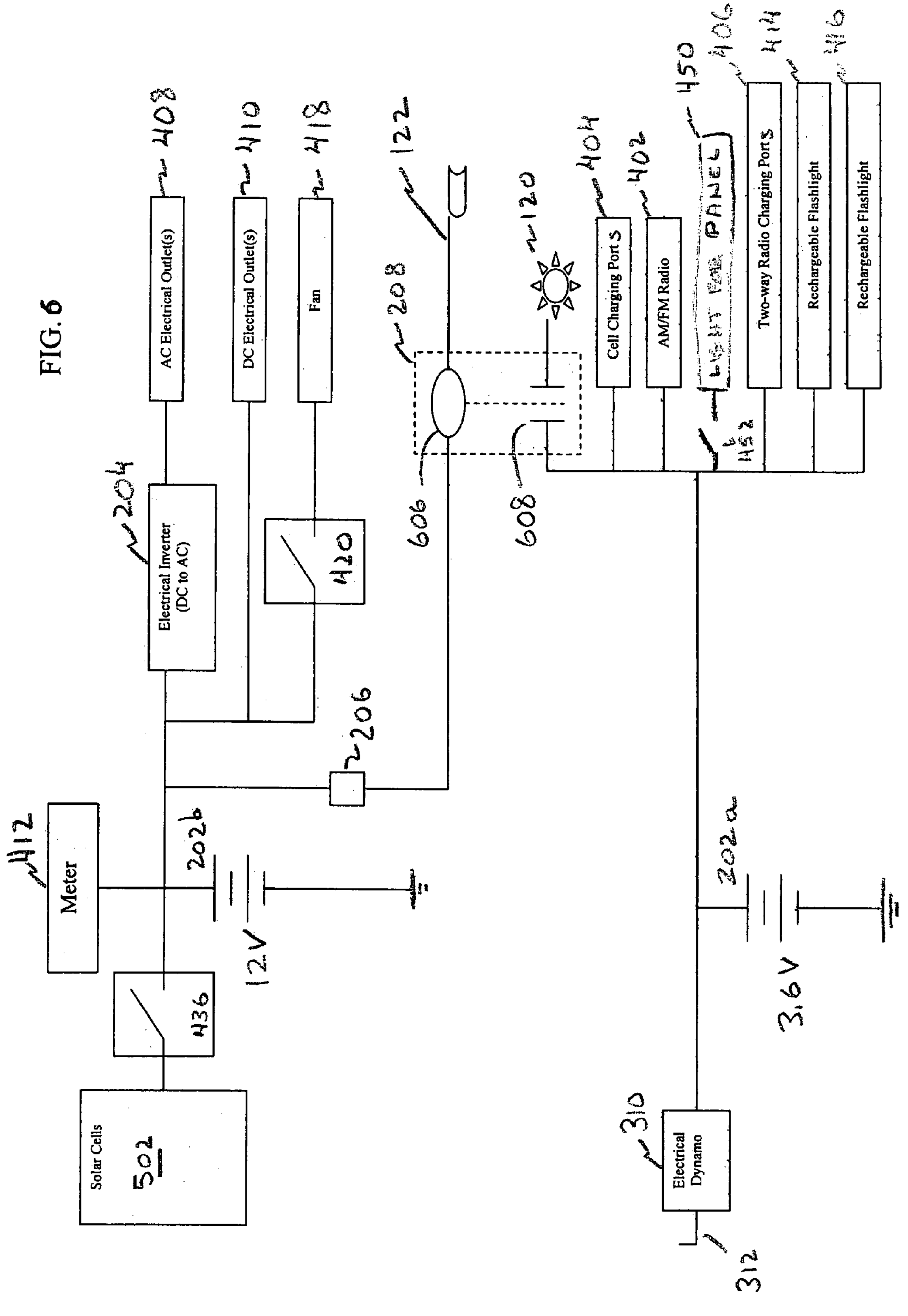
FIG. 6 is a schematic diagram showing the electrical connections between the various electrical components associated with the survival kit of FIGS. 1A, 1B and 2-5.

FIG. 6 is a schematic diagram showing the electrical connections between the various electrical components associated with the survival kit 100 of FIGS. 1A, 1B and 2-5.

The illustrated diagram shows the first rechargeable energy source 202*a* as a 3.6 volt battery. The first rechargeable energy source 202*a* is electrically connected, via a normally closed electrical contact, to the light 120 that is exposed at the outer surface of the kit's cover 106 (see FIG. 1A). The normally closed electrical contact 602 is part of the household power failure circuit 208. The illustrated first rechargeable energy source 202*a* is connected directly to the cellular telephone charging ports 404, the radio 402, the two-way radio charging ports 406 and the rechargeable flashlights 414, 416, each of which is exposed at the kit's instrument panel 124 (see FIG. 4).

The electrical dynamo 310 (which has a hand-operable cranking mechanism 312) is directly electrically connected to the first rechargeable energy source 202*a* and to the cellular telephone charging ports 404, the radio 402, the two-way radio charging ports 406 and the rechargeable flashlights 414, 416. The electrical dynamo 310 also is electrically connected (via normally closed contact 502) to the light 120 exposed at the outer surface of the kit's cover 106.

The illustrated diagram also shows the second rechargeable energy source 202*b* as a 12 volt battery. The second rechargeable energy source 202*b* is electrically connected, via a disconnect switch 420, to a fan 418 that is exposed at the kit's instrument panel 124 (see FIG. 4). The illustrated second rechargeable energy source 202*b* is connected directly to the DC electrical outlets 410 that are also exposed at the kit's instrument panel 124 (see FIG. 4). Additionally, the second rechargeable energy source 202*b* is electrically connected, via electrical inverter 204, to the AC electrical outlets 408 that also are exposed at the kit's instrument panel 124 (see FIG. 4).

The solar panel 502 (which includes a plurality of solar cells) is electrically connected, via solar panel disconnect switch 436, to the second rechargeable energy source 202*b*, to the fan disconnect switch 420, to DC electrical outlets 410 and, via electrical inverter 204, to the AC electrical outlets 408. In some embodiments, a charge control circuit is coupled to the output of the solar panel 502. The solar panel disconnect switch 436 is provided because, when the solar panel 502 is not generating electricity (e.g., when it is not exposed to a useful light source), the solar panel could undesirably act as an electrical load on the second rechargeable energy source 202*b* and, thus, possibly drain the charge from the second rechargeable energy source 202*b*.

The voltmeter 412 is electrically connected to the second rechargeable energy source 202*b* and is, therefore, adapted to measure and display the voltage available at the output node of the second rechargeable energy source 202*b*. A user, therefore, might use the voltage readings provided by that voltmeter 412 to determine when it might be desirable to activate and connect (by closing disconnect switch 436) the solar panel 502 to the second rechargeable energy source 202*b*.

The electrical power cord 122 with the electrical plug 604 at its distal end for plugging into a household electrical outlet is electrically connected, via charge control circuit 206 to the second rechargeable energy source 202*b* and to each of the loads associated with the second rechargeable energy source 202*b*. If the electrical power cord 122 is electrically connected to a household electrical outlet (not shown in FIG. 6), then the cord 122 is adapted to deliver electrical charging energy to the second rechargeable energy source 202*b* and to provide energy to the electrical loads that are coupled to the second rechargeable energy source 202*b*.

The household power failure circuit 208 includes an electrical sensing element 606 and a normally closed contact 602. The electrical sensing element 606 senses whether voltage is being provided at the electrical cord 122 from the household power source. If voltage is present at the electrical cord 122, then the normally closed contact 602 is held open. Upon failure of voltage at the electrical cord 122, the normally closed contact 602 closes. When the normally closed contact 602 closes, energy from the first rechargeable energy source 202*a* is provided (via the normally closed contact 602) to illuminate the light 120.

Figure 7:
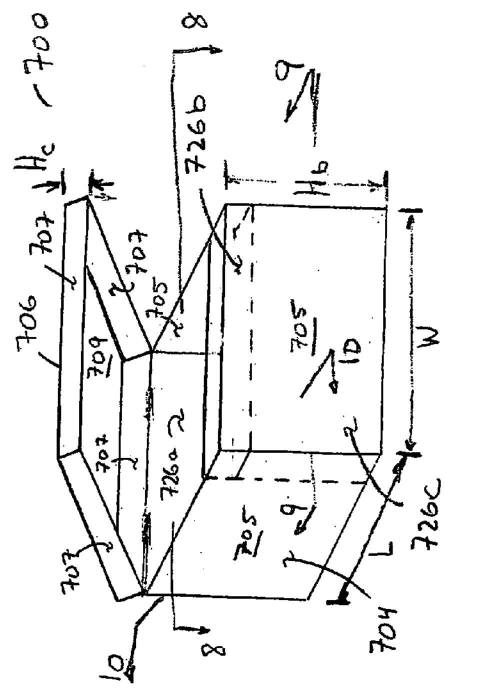
FIG. 7 is a cutaway perspective view of an alternative portable survival kit.

FIG. 7 is a cutaway perspective view of an alternative portable survival kit 700.

The illustrated survival kit 700 includes a housing 702 with a body portion 704 and a cover 706. The body portion 704 and the cover 706 are made of a substantially rigid material, such as molded plastic. In the illustrated embodiment, body portion 704 and the cover 706 are secured together via a first hinged connection 708*a* so that the cover 706 can be swung open to expose a compartment inside the housing 702. The cover 706 mates with the body portion 704 in a manner such that the internal compartment is sealed in at least a substantially water-resistant manner. However, more preferably, the internal compartment is sealed in a substantially water-tight manner.

The illustrated kit 700 is fairly compact to facilitate its portability. In some embodiments, wheels can be included on the housing 702 to further facilitate the kit's portability.

The body portion 704 includes four sides 705 and a bottom (not visible in FIG. 7). The cover 706 includes four sides 707 and a top 709. The body portion 704 has a height $H_b$ (top to bottom dimension) of approximately six (6) inches and the cover 706 has a height $H_c$ of approximately one (1) inch. Accordingly, when the cover 706 is closed against the body portion 704, the housing 702 has an overall height ($H_b+H_c$) of approximately seven (7) inches. The housing has a width W (side to side) of approximately nine (9) inches and a length L (front to back) of approximately ten (10) inches.

The illustrated housing 702 includes a set of internal walls that cooperatively define three discrete internal compartments: a supply storage compartment 726*a*, an instrument panel compartment 726*b* and a battery/electronics/charger compartment 726*c*. Although a specific arrangement of compartments is shown, variations in the specific arrangement of compartments are possible.

The supply storage compartment 726*a* has a length of approximately seven (7) inches, extends across the entire width W of the housing 702 and the entire height ($H_b+H_c$) of the housing 702. The instrument panel compartment 726*b* has a height of approximately one (1) inch, a length of approximately three (3) inches and extends across the entire width W of the housing 702. The battery/electronics/charger compartment 726*c* has a height of approximately six (6) inches, a length of approximately three (3) inches and extends across the entire width W of the housing 702.

Figure 8:
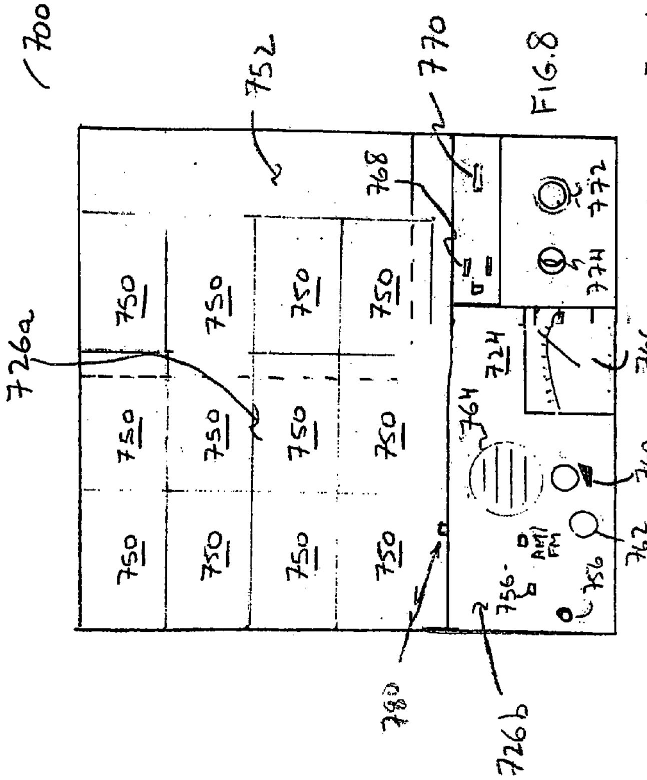
FIG. 8 is a plan view of the survival kit of FIG. 7 taken across lines 8-8.

FIG. 8 is a plan view of the survival kit 700 of FIG. 7 taken across lines 8-8. The illustrated plan view shows the supply storage compartment 726*a* and the instrument panel compartment 726*b* of the kit 700.

The supply storage compartment 726*a* includes twelve (12) water containers 750. In some implementations, the water containers can be, for example, 8.45 fluid ounce (250 ml) Aqua Blox® water containers, available from Aqua Blox®, LLC of West Palm Beach, Fla. In some implementations, each water container 750 is approximately 5.625 inches by 3.125 inches by 0.875 inches and contains enough water for a half of a person-day. The illustrated supply storage compartment also includes food items (not visible in FIG. 8) stored underneath the illustrated water containers 250. Other supplies (e.g., first aid supplies, additional water containers, etc.) can be stored in the illustrated supply storage compartment 726*a* in the space 752 next to the water containers 750.

The illustrated instrument panel compartment 726*b* includes an instrument panel 724 with a light bulb 754, a switch 756 for the light bulb 754. The instrument panel 724 also includes a radio 758 with an on/off knob 760, a tuning knob 762 and a speaker 764. The instrument panel 724 also has a voltmeter 766 for one of the kit's rechargeable energy sources. An electrical inverter 204 is exposed at the instrument panel 724 and includes an integral three-prong alternating current outlet 768 as well as an integral Universal Serial Bus (USB) charging port 770. A direct current outlet 772 and a switch 774 for the direct current outlet 772 also are exposed at the instrument panel 724.

Typically, the light bulb 754 is adapted to illuminate the instrument panel 724 so that a user can see what he or she is doing when attempting to use the devices exposed thereon. The illustrated electrical inverter 204 is an XPower™ Pocket Inverter 100, available from Xantrex Technology, Inc. of Vancouver, British Columbia. The illustrated Universal Serial Bus (USB) charging port 770 is adapted to interface with personal digital assistants, etc. for charging purposes.

A charging port 780 for a cellular telephone is exposed to a side surface of the instrument panel 724. The illustrated charging port 780 is adapted to receive a charging cable that can be coupled to a cellular telephone (not shown).

Figure 9:
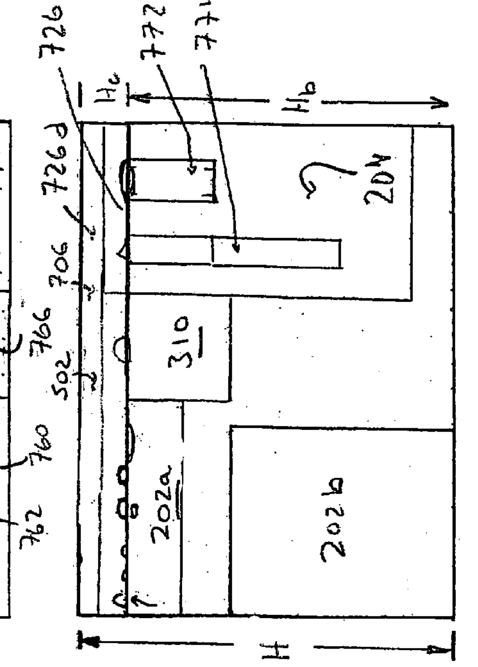
FIG. 9 is a cross-sectional view of the survival kit of FIG. 7 taken across lines 9-9.
Figure 11:
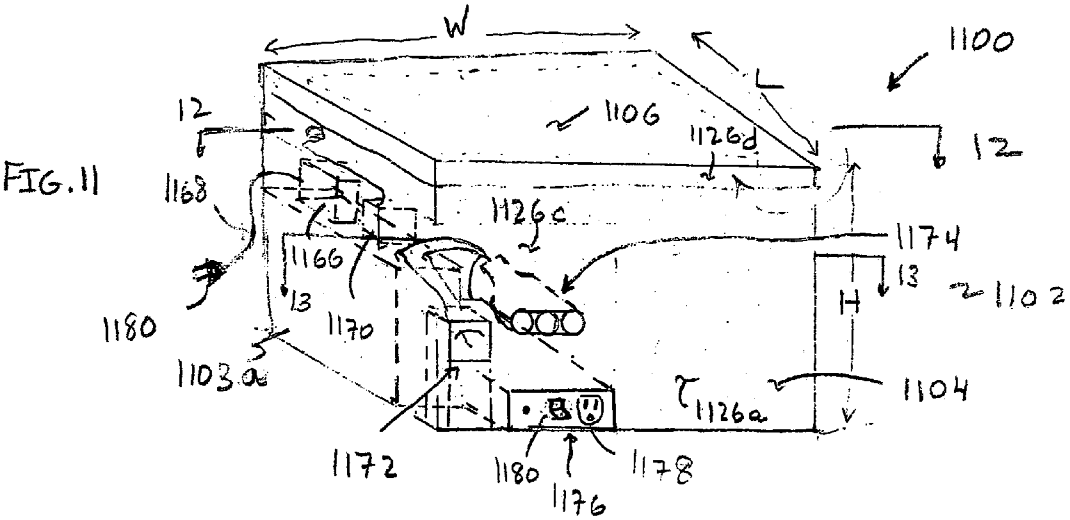
FIG. 11 is a cutaway perspective view of yet another portable survival kit.
Figure 13:
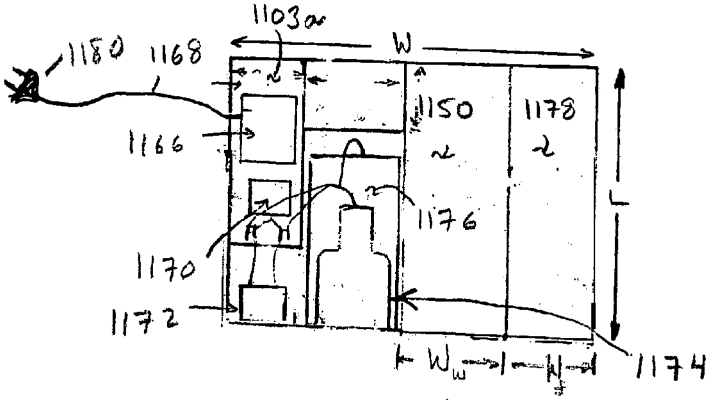
FIG. 13 is a plan view of the portable survival kit of FIG. 11 taken along lines 13-13.
Figure 12:
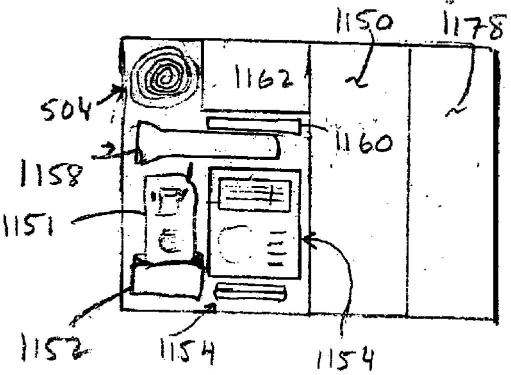
FIG. 12 is a plan view of the portable survival kit of FIG. 11 taken along lines 12-12.
Figure 14:
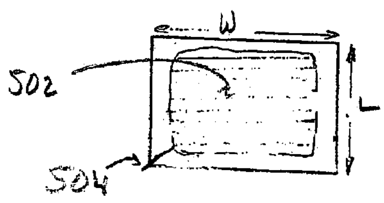
FIG. 14 is a view of the inside of the cover of the portable survival kit of FIG. 11.

FIG. 9 is a cross-sectional view of the survival kit 700 of FIG. 7 taken across lines 9-9. In the illustrated embodiment, the kit's cover 706 is shown in a closed position. The illustrated view shows a storage space 726*d* (in the cover 706), the instrument panel compartment 726*b* in the body portion 704 and the battery/electronics/charger compartment 726*c* in the body portion 704.

The storage space 726*d* in the cover 706 includes a solar panel 502. In the illustrated embodiment, the solar panel 502 is a SUNLINQ™ solar panel having PowerFLEX™ technology, available from Global Solar Energy, Inc. of Tucson, Ariz. The illustrated solar panel 502 is folded for storage. The approximate dimensions of the folded solar panel 502 are 0.5 inches high, nine (9) inches long and five (5) inches wide. The solar panel 502 can be unfolded to dimensions of approximately 0.03 inches high, nine (9) inches long and 29.5 inches wide.

The illustrated battery/electronics/charger compartment 726*c* includes first and second rechargeable energy sources 202*a* and 202*b*, an electrical dynamo 310 with a hand crank mechanism (the hand crank is not visible in FIG. 9) and portions of the electrical inverter 204, the direct current outlet 772 and the switch 774 for the direct current outlet 772. An internal wall 776 is behind the battery/electronics/charger compartment 726*c* and separates that compartment 726*c* from the supply storage compartment 726*a* behind the wall 776.

Figure 10:
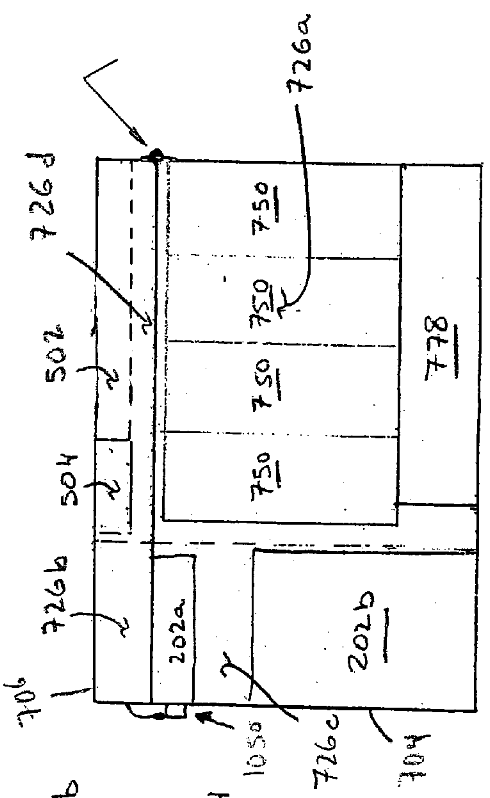
FIG. 10 is a cross-sectional side view of the survival kit 700 of FIG. 7 taken across lines 10-10.

FIG. 10 is a cross-sectional side view of the survival kit 700 of FIG. 7 taken across lines 10-10.

The illustrated survival kit 700 shows the supply storage compartment 726*a*, the instrument panel compartment 726*b*, the battery/electronics/charger compartment 726*c* and the storage space 726*d* in the cover 706.

The supply storage compartment 726*a* shows water containers 750 and food items 778 stored beneath the water containers 750. In the illustrated embodiment, the food items 778 include two packages of The ER Bar™ nutrition bars, available from Vita-Life Industries™, Inc. of Moorpark, Calif. Each package includes six bars. The dimensions of each package are approximately 6.25 inches by 4.5 inches by 1.375 inches.

The illustrated view of the battery/electronics/charger compartment 726*c* shows that the first and second rechargeable energy sources 202*a* and 202*b* extend almost entirely to the rear wall 776 in that compartment 726*c*.

The illustrated view of the storage space 726*d* in the cover 706 shows the solar panel 502 and its electrical cord 504 stored therein.

A latch 1050 is provided and spans across the interface between the body portion 704 of the housing and the cover 706. When the latch is in a latched position, the latch 1050 maintains a very tight seal between the body portion 704 and the cover 706. A hinged connection 1052 also is provided at the interface between the body portion 704 and the cover 706. The hinged connection 1052 is adapted so that, when the latch is not engaged, the cover 706 can swing about the hinged connection 1052 relative to the body portion 704.

FIGS. 11-14 show various views of yet another embodiment of the portable survival kit 1100.

The illustrated survival kit 1100 includes a housing 1102 with a body portion 1104 and a cover 1106. The body portion 1104 and the cover 1106 define an internal compartment within the housing 1102. The cover 1106 is removable from the body portion 1104, however, is securable to the body portion 1104 in a manner that ensures that the internal compartment is at least water resistant and, perhaps, water proof.

The housing 1102 has an overall height H of approximately ten (10) inches, an overall length L of approximately eight (8) inches and an overall width W of approximately twelve (12) inches. The housing's 1102 compact nature facilitates its portability.

The housing 1102 defines a number of compartments therein including a supply storage compartment 1126*a*, an instrument compartment 1126*b*, a battery/electronics/charger compartment 1126*c* and a cover storage compartment 1126*d*. Although a specific arrangement of compartments is shown, variations in the specific arrangement of compartments are possible.

The supply storage compartment 1126*a* includes containers 1178 of food and water containers 1150. The width $W_w$ of the water storage space is approximately 3.5 inches and the width $W_f$ of the food storage space is approximately 2.5 inches. The food and water storage spaces extend from the bottom of the housing 1102 to the cover 1106 and extend from the front of the housing 1102 to the back of the housing 1102.

The illustrated instrument compartment 1126*b* (see, e.g., FIG. 12) includes a two-way radio 1151 in a charging port 1152, a multi-band radio 1154, a multi-purpose tool 1156, a large flashlight 1158, a small flashlight 1160, medical supplies 1162 and a ten (10) foot long electrical cord 504 for the kit's solar panel.

The battery/electronics/charger compartment 1126*c* includes a first rechargeable energy source 1103*aa* (i.e., in the illustrated embodiment a 12 volt battery), an AC charger 1166 with an electrical cord 1168 attached thereto, a charge controller 1170 from the solar panel input, a voltmeter 1172, a set of three direct current electrical outlets 1174 and an electrical inverter 1176 with an integral three-prong alternating current electrical outlet 1178 and a switch 1180.

The storage compartment 1126*d* under the cover 1106 of the kit 1100 is storing a solar panel 502. The solar panel is a folded solar panel. In one embodiment, the solar panel is a SUNLINQ™ solar panel having PowerFLEX™ technology, available from Global Solar Energy, Inc. of Tucson, Ariz.

The electrical cord 1168 has a plug 1180 at a distal end thereof. The plug 1180 is adapted to be plugged into a standard household electrical outlet (not shown). The electrical cord is attached to the AC charger 1166. The AC charger 1166 is adapted to maintain charge at and, if necessary, to recharge the first rechargeable energy source 1103*a*.

The charge controller 1170 is electrically connected between the solar panel 502 and the first rechargeable energy source 1103*a*. The charge controller 1170 is adapted so as to control the charging current provided to the first rechargeable energy source 1103*a* from the solar panel 502.

The voltmeter 1172 is connected to the terminals of the first rechargeable energy source 1103*a*. Therefore, the voltmeter 1172 provides an indication of the amount of charge remaining on that source 1103*a*. The set of three direct current electrical outlets 1174 are also connected to the terminals of the first rechargeable energy source 1103*a*. The electrical inverter 1176 also is connected to the terminals of the first rechargeable energy source 1103*a*. The switch 1180 on the electrical inverter turns the inverter 1176 on and off.

In the illustrated embodiment, the voltmeter 1172, the DC outlets 1174 and the AC outlet 1178 of the electrical inverter 1176 are exposed through the housing 1102. Additionally, the electrical cord 1168 passes through the housing 1102. Accordingly, in embodiments where it is desirable for the internal compartment of the kit 1100 to be water resistant or substantially water proof, particular care is used to adequately seal the openings in the housing that allow access to the voltmeter 1172, the DC outlets 1174, the AC outlet 1178 and the electrical cord 1168.

In some implementations, additional rechargeable energy sources are provided in the illustrated kit. Additionally, other means (e.g., solar panels, hand crank generators, gas powered generators, etc.) for charging those rechargeable energy sources are provided.

Figure 15:
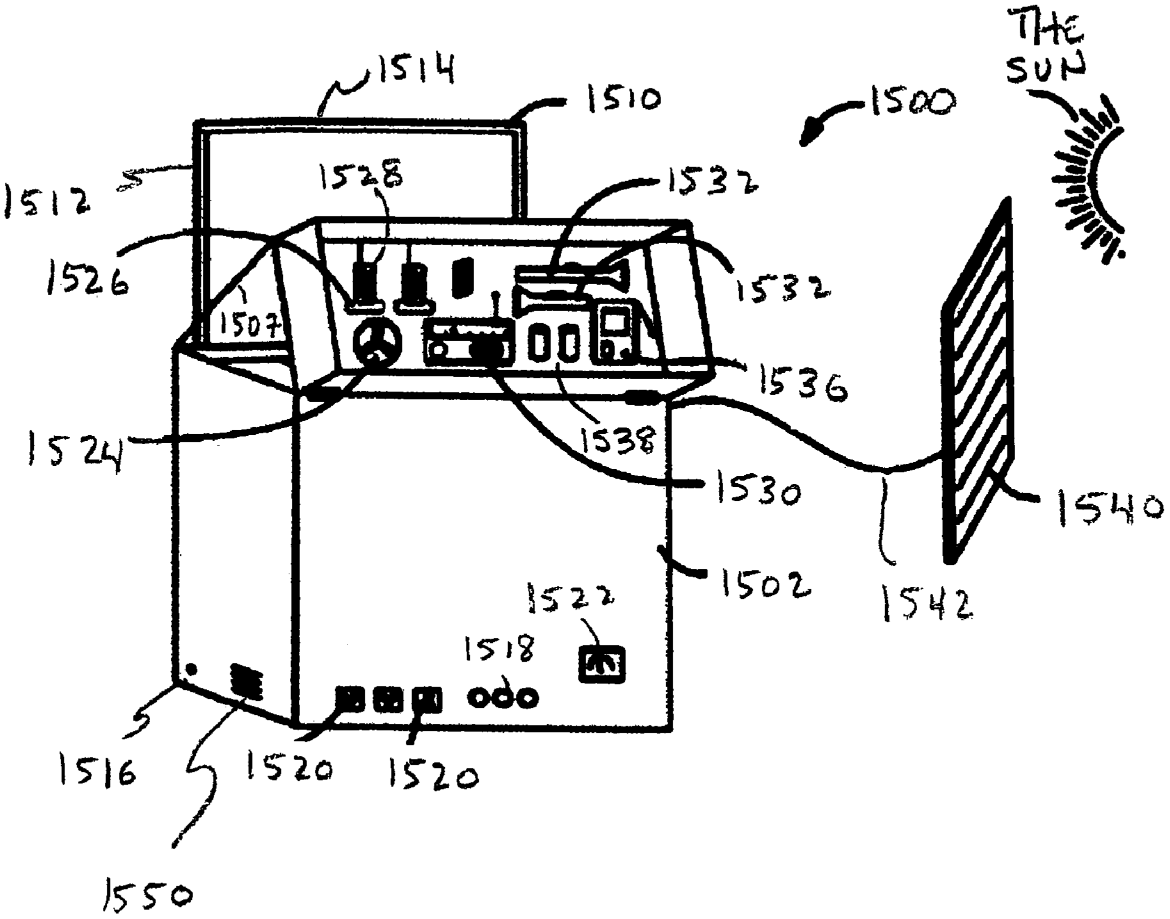
FIG. 15 is a perspective view of still another embodiment of a portable survival kit.

FIG. 15 is a perspective view of still another embodiment of a portable survival kit.

The illustrated survival kit 1500 includes a housing 1502 with a body portion 1504 and a cover (see 1507 in FIG. 16), which has been removed from the body portion 1504 and, therefore, is not shown in the illustrated figure. Typically, the cover is adapted so that it can be secured to the body portion 1504 in a substantially secure manner and, in some instances, a substantially water resistant or water proof manner. The body portion 1504 includes four side walls and a bottom, which is not visible in the illustrated view.

The illustrated housing 1502 has a pair of holes 1516 at the lower corners of opposite side walls of the housing 1502. Those holes 1516 are adapted to receive an axis of a wheel. Accordingly, the housing 1502 is adapted to be fit with an optional set of wheels to enhance the portability of the kit 1500.

The illustrated survival kit 1500 includes a telescoping handle 1510, which has a pair of extension bars 1512 and a gripping portion 1514 that spans between the distal ends of each extension bar 1512. The extension bars 1512 mate with respective sleeves (not visible in FIG. 15) formed in the housing 1502 and are movable in an axial direction (i.e., up and down) within those sleeves. Accordingly, the telescoping handle 1510 can be moved between a fully extended position with the extension bars 1512 fully extended from their respective sleeves and a fully retracted position with the extension bars 1510 fully nestled within their respective sleeves. With the telescoping handle 1510 in the fully extended position, a user can easily grip the gripping portion 1514 and direct movement of the kit 100, particularly if wheels are in place (coupled to the holes 1516) at the bottom of the kit 1500. Otherwise, the telescoping handle 1510 can be stowed in the fully retracted position for storing.

Direct current electrical outlets 1518, alternating current 1520 electrical outlets and a voltmeter 1518 are exposed through the body portion 1504 of the housing 1502. The direct current outlets 1518 are directly electrically coupled to a first rechargeable electrical energy source (not visible in FIG. 15, but see 1602 in FIG. 16) inside the housing 1502. The alternating current outlets are electrically connected, via an electrical inverter (not visible in FIG. 15, but see 1604 in FIG. 16) coupled to the housing 1502. The voltmeter 1518 is electrically coupled so as to display the voltage available from the internal first rechargeable electrical energy source 1602.

The illustrated embodiment includes an instrument panel 1506 that is able to sit flush against the top edges of the body portion 1504. The instrument panel is coupled to one of those side walls by a hinged connection 1508. Accordingly, the instrument panel 1506 is movable about the hinged connection between a position substantially flush with the top edges of the body portion 1504 and an angled position as illustrated. When oriented as shown in the angled position, the instruments and devices shown thereupon might be easier to access and interact with. Additionally, orienting the instrument panel 1506 as shown enables a user to access the storage compartments inside the housing 1502. Brace bars 1507 are provided to hold the instrument panel 1506 in its angled orientation.

Exposed at the illustrated instrument panel are: a fan 1524, a pair of charging ports 1526 for two-way radios 1528, a pair of two-way radios 1528 in the charging ports 1526, a standard AM/FM radio 1530, a pair of flashlights 1532, a charging port 1534 for a cellular telephone 1536 and a set of replacement batteries 1538 for the flashlights. In some embodiments, a number of other items and devices can be exposed at the instrument panel.

An unfolded (but foldable) solar panel 1540 is shown and is electrically attached to the first rechargeable energy source (1602 in FIG. 16) via electrical cord 1542. In a typical embodiment, the electrical cord 1542 will be at least approximately ten feet long to allow the solar panel to be positioned in a stream of sunlight even if the survival kit 1500 itself is not exposed to the sunlight. The electrical cord 1542 facilitates electrically coupling the solar panel 1540 to the first rechargeable energy source 1602 inside the housing 1502. That electrical coupling can be direct or more likely, is through a switch or charge control circuit (not shown).

A pair of vents 1550 is provided at opposite side surfaces of the housing 1502. The vents allow for circulation of ambient air inside the housing to facilitate cooling, particularly of the electronic, heat generating equipment inside the housing. In some embodiments, a vent is not provided in the housing 1502.

Figure 16:
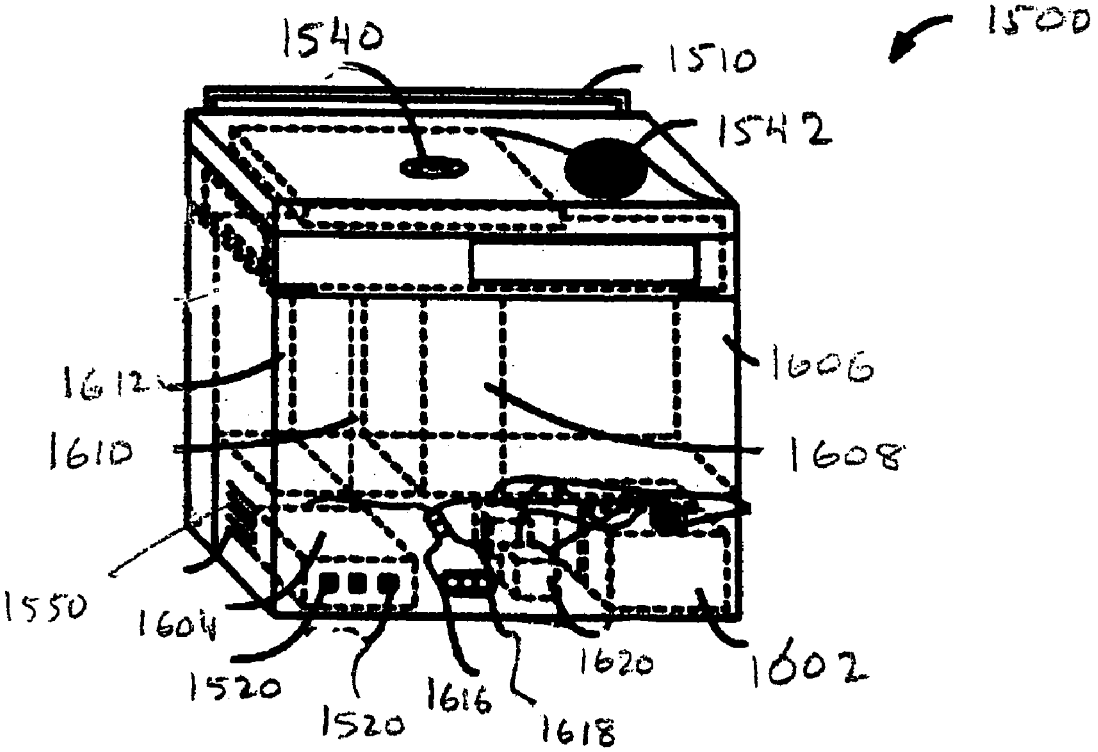
FIG. 16 is a perspective cutaway view of the portable survival kit of FIG. 15.

FIG. 16 is a cross-sectional perspective view of the survival kit 1500 of FIG. 15, except the view in FIG. 16 shows a cover 1507 in place atop the survival kit 1500.

As shown, the illustrated cover 1507 includes storage provisions for the solar panel 1540 and its associated electrical cord 1542.

The instrument panel 1506 is shown positioned flat against the upper edges of the body portion 1504 of the housing 1502. Beneath the instrument panel 1506 are a series of vertically disposed walls that define four distinct storage compartments: a food storage compartment 1606, a water storage compartment 1608, a medical supplies compartment 1610 and a survival supplies compartment 1612. In a typical embodiment, the food storage compartment 1606 stores food items such as those discussed above, the water storage compartment 1608 stores water containers such as those discussed above, the medical supplies compartment 1610 stores a variety of medical supplies including, for example, those discussed above and the survival supplies compartment 1612 stores a variety of survival supplies, some of which are discussed above.

Beneath the storage compartments 1606, 1608, 1610 and 1612 is an electrical equipment compartment 1614. The electrical equipment compartment 1614 includes a first rechargeable energy source 1602, an electrical inverter 1604 with the alternating current electrical outlets 1520 thereon, a module 1616 with the direct current electrical outlets 1518 thereon, a battery charger 1618 and a charge control circuit 1620 for the solar panel. In most embodiments, the electrical equipment compartment includes a second rechargeable energy source as well.

Typically, the first rechargeable energy source 1602 is a 3.6 volt battery and the second rechargeable energy source is a 12 volt battery. The electrical inverter 1604 and the module 1616 for the direct current electrical outlets 1518 are electrically coupled to the first rechargeable energy source 1602.

The battery charger 1618 has an electrical cord (not shown) attached thereto. The electrical cord has a plug at a distal end thereof and is adapted to be plugged into a household electrical outlet (not shown). The battery charger 1618, therefore, is adapted to provide charging current from a standard household electrical outlet to the first rechargeable energy source 1602 for maintaining or recharging thereat.

The charge control circuit 1620 is electrically connected between the solar panel 1540 and the second rechargeable energy source. The charge control circuit 1620 is adapted to control the charging current provided to the second rechargeable energy source from the solar panel 1540.

Although the invention has been described with reference to particular embodiments, it is to be understood that these embodiments are merely illustrative of the principles and applications of the present invention. It is therefore understood that numerous modifications may be made to the illustrative embodiments and that other arrangements may be derived without departing from the spirit and scope of the present invention as defined by the claims.

For example, in some embodiments, the precise arrangement of components and compartments for containing those components can be varied. Additionally, the specific selection of components to be included in a given kit can vary considerably.

A particular kit can include any number of discrete rechargeable energy sources. Each such energy source can be adapted to operate at the same voltage as one another or at different voltages. The energy sources can be adapted to provide various levels of redundancy to different loads that are associated with a kit. Additionally, operations of various devices of a kit can be automated. Additionally, a variety of safety features can be implemented in conjunction with the devices of the kit.

Some embodiments of the kit include a number of additional elements, not specifically mentioned herein, that are adapted to receive energy from the rechargeable energy sources. However, most of those elements are likely related in some way to enhancing the survival experience of a person facing an emergency situation.

Moreover, other methods of maintaining and/or recharging the rechargeable energy sources may be implemented. For example, such methods can include the use of wind power, water power, heat, etc. to generate charging or recharging current as required. Some embodiments include a gas operated engine coupled to a generator. Any combination of charging current sources can be provided, with the ability to cross connect the provided sources. Additionally, a variety of charge control circuitry can be included between one or more of the sources of charging current (e.g., the dynamo, the solar panels, the wind-powered generator and the household outlet plug) and one or more of the rechargeable energy sources. Such control circuitry can facilitate maintaining the charge on respective ones of the energy sources. Also, the control circuitry can, in some instances, prevent the energy sources from draining back to any of the sources of charging current when the sources are idle. Each source of charging current can be used, in some embodiments, to charge more than one energy source.

Switches can be provided for a variety of purposes. For example, a kit might include a circuit switch that enables the energy sources to supply energy to the DC outlets and to the electrical inverter that is coupled to the AC outlets. Additionally, a switch could be provided to activate the electrical inverter. The size and capacity of various components can vary.

Externally exposed components (e.g., outlets, switches, meters, etc., if any) can be covered and/or sealed to facilitate water resistance of the kit.

The kit can include a variety of alarms, both visual and audible, to signal for help or to indicate a fault occurrence of some sort associated with the kit.

Internal padding can be provided within the housing and, for example, around sensitive electronic equipment to prevent damage of such equipment in earthquakes, etc. A variety of materials are suitable for constructing the housing, etc. Typically, however, such materials will desirably provide protection of the components and supplies stored therein suitable for any expected emergency conditions.

Thermal insulation can be provided in one or more areas of the kit to help store temperature-sensitive products in the kit for a period of time that is longer than otherwise possible. Also, in some embodiments, a refrigerated compartment can be provided in part of the survival kit, with an operable refrigeration system coupled thereto to maintain a cool temperature therein.

The overall size of the kit can vary from quite large to quite small. If the kit is adapted to be quite small, only the most crucial items in the kit might be included. However, a small kit like that might be desirable if a person is exposed to an emergency situation that requires them to flee. In such an instance, the smaller kit would be easier to flee with. Some embodiments of the kit can be incorporated into carrying cases, such as a backpack, a briefcase, etc.

Moreover, the types of food, water, medical and survival supplies provided with a kit can vary considerably. The internal arrangement of supplies and components inside the kit can vary considerably. The physical dimensions and shape of the kit can vary considerably. A variety of different communication equipment may be associated with the kit.

Accordingly, other embodiments are within the scope of the following claims.

What is claimed is:

1. A portable survival kit comprising:

a housing defining an internal compartment, the housing comprising a body portion and a movable cover coupled to the body portion by a first connection, wherein the first connection permits the cover to be opened with respect to the body portion to provide access into the internal compartment, and wherein the body portion and the cover are adapted to mate with each other in a manner that seals the internal compartment;

one or more rechargeable energy sources inside the internal compartment;

one or more electrical generators inside the internal compartment, each electrical generator being adapted to facilitate charging of at least one of the rechargeable energy sources;

one or more electrical elements inside the internal compartment, each electrical element being adapted to receive electrical energy from at least one of the rechargeable energy sources;

a movable instrument panel including a proximal end and a distal end, the instrument panel disposed at a first location inside the internal compartment and having an upper surface exposing the one or more electrical elements located on the upper surface, wherein the one or more electrical elements are accessible for use by a user at the first location when the cover is opened;

a source of edible human nourishment stored inside a storage compartment located inside the internal compartment, the storage compartment inaccessible to the user when the movable instrument panel is at the first location;

wherein the proximal end of the movable instrument panel is rotatably coupled to an upper edge of the body portion by a second connection different from the first connection, such that moving the distal end of the instrument panel about the second connection moves the instrument panel to a second location outside the internal compartment and provides access into the storage compartment.

2. The portable survival kit of claim 1 wherein the housing is substantially water resistant.

3. The portable survival kit of claim 1 wherein the housing is substantially water proof.

4. The portable survival kit of claim 1 wherein the one or more electrical generators comprise:

a dynamo with a hand-operable mechanical actuator to facilitate inputting mechanical energy to the dynamo.

5. The portable survival kit of claim 4 wherein the mechanical actuator is a cranking mechanism.

6. The portable survival kit of claim 1 wherein the one or more electrical generators comprise:

a plurality of solar cells.

7. The portable survival kit of claim 6 wherein the plurality of solar cells is formed on a flexible substrate that is foldable for storage inside the compartment.

8. The portable survival kit of claim 1 wherein the one or more electrical generators comprise:

a wind-operable generator, wherein the wind-operable generator is storable within the compartment.

9. The portable survival kit of claim 1 further comprising a power cord adapted for connection to a household power outlet, wherein the power cord is adapted, when connected, to deliver charging current from the household power outlet to at least one of the rechargeable energy sources.

10. The portable survival kit of claim 9 further comprising:

a light coupled to the housing and adapted to illuminate upon failure of household power via the power cord.

11. The portable survival kit of claim 10 wherein the light is exposed at an external surface of the housing.

12. The portable survival kit of claim 1 wherein the one or more electrical elements comprise:

a cellular telephone charging port inside the compartment.

13. The portable survival kit of claim 1 wherein the one or more electrical elements comprise:

a wireless communication device inside the compartment.

14. The portable survival kit of claim 1 wherein the one or more electrical elements include a device selected from the group consisting of a television, a rechargeable flashlight, a fan, a D.C. outlet and an A.C outlet.

15. The portable survival kit of claim 1 wherein the one or more rechargeable energy sources comprise:

a first battery adapted to supply electrical energy to a first set of the electrical elements; and a second battery adapted to supply electrical energy to a second set of the electrical elements, wherein the first set of electrical elements includes electrical elements that are more critical to survival than the second set of electrical elements.

16. The portable survival kit of claim 15 wherein the first set of electrical elements comprises:

a wireless communication device; and a light; and wherein the second set of electrical elements comprises:

D.C. and A.C. electrical outlets.

17. The portable survival kit of claim 1 wherein the source of edible human nourishment comprises:

a food source; and a water source, wherein the source of edible human nourishment is adapted to provide a human with nourishment for a specific number of person-days.

18. The portable survival kit of claim 1 further comprising:

medical and survival supplies inside the housing.

19. The portable survival kit of claim 1 further comprising:

wheels coupled to the housing; and a telescoping handle coupled to the housing.

20. A portable survival kit comprising:

a substantially water-resistant housing defining an internal compartment, the housing comprising a body portion and a movable cover coupled to the body portion by a first connection, wherein the first connection permits the cover to be opened with respect to the body portion to provide access into the internal compartment, and wherein the body portion and the cover are adapted to mate with each other in a manner that seals the internal compartment;

first and second rechargeable energy sources inside the internal compartment;

a dynamo inside the internal compartment and having a hand-operable mechanical actuator to facilitate inputting mechanical energy to the dynamo, the dynamo adapted to facilitate charging of the first rechargeable energy source;

a plurality of solar cells formed on a flexible substrate that is foldable for storage inside the internal compartment, the plurality of solar cells adapted to facilitate charging of the second rechargeable energy source;

a first set of electrical elements inside the internal compartment and adapted to receive electrical energy from at least the first rechargeable energy source;

a second set of electrical elements inside the internal compartment and adapted to receive electrical energy from at least the second rechargeable energy source;

a movable instrument panel including a proximal end and a distal end, the instrument panel disposed at a first location inside the internal compartment and having an upper surface exposing the first and second set of electrical elements located on the upper surface, wherein the first and second set of electrical elements are accessible for use by a user at the first location when the cover is opened;

a source of edible nourishment stored inside a storage compartment located inside the internal compartment and adapted to provide a human with nourishment for a specific number of person-days, the storage compartment inaccessible to the user when the movable instrument panel is at the first location;

wherein the proximal end of the movable instrument panel is rotatably coupled to an upper edge of the body portion by a second connection different from the first connection, such that moving distal end of the instrument panel about the second connection moves the instrument panel to a second location outside the internal compartment and provides access into the storage compartment.

21. The portable survival kit of claim 20 wherein the first set of electrical elements comprises a wireless communication device and a light, and wherein the second set of electrical elements comprises D.C. and A.C. electrical outlets.

22. The portable survival kit of claim 21 further comprising:

a power cord adapted for connection to a household power outlet and adapted, when connected to a household power outlet, to deliver charging current from the household power outlet to the second rechargeable energy source.

23. The portable survival kit of claim 22 further comprising:

a light coupled to the housing and adapted to illuminate upon failure of household power via the power cord.

24. A portable survival kit comprising:

a substantially water proof housing defining an internal compartment, the housing comprising a body portion and a movable cover coupled to the body portion by a first connection, wherein the first connection permits the cover to be opened with respect to the body portion to provide access into the internal compartment, and wherein the body portion and the cover are adapted to mate with each other in a manner that seals the internal compartment;

medical and survival supplies inside the internal compartment;

a plurality of rechargeable energy sources inside the internal compartment, wherein the plurality of energy sources includes a first rechargeable battery rated at a first voltage, and a second rechargeable battery rated at a second voltage different from the first voltage;

one or more electrical generators inside the internal compartment, each electrical generator being adapted to facilitate charging of at least one of the rechargeable energy sources, wherein the plurality of electrical generators include at least one selected from the group consisting of a dynamo with a hand-operable mechanical actuator, a plurality of solar cells, and a wind-operable generator;

a plurality of electrical elements inside the internal compartment, each electrical element being adapted to receive electrical energy from at least one of the rechargeable energy sources, wherein the plurality of electrical elements includes a cellular telephone charging port, a wireless communications device, a rechargeable flashlight, a D.C. outlet, and an A.C outlet;

a power cord adapted for connection to a household power outlet, wherein the power cord is adapted, when connected, to deliver charging current from the household power outlet to at least one of the rechargeable energy sources;

a light coupled to the housing and adapted to illuminate upon failure of household power via the power cord;

a movable instrument panel including a proximal end and a distal end, the instrument panel disposed at a first location inside the internal compartment and having an upper surface exposing the plurality of electrical elements located on the upper surface, wherein the plurality of electrical elements are accessible for use by a user at the first location when the cover is opened;

a source of edible human nourishment stored inside a storage compartment located inside the internal compartment, the storage compartment inaccessible to the user when the movable instrument panel is at the first location;

wherein the proximal end of the movable instrument panel is rotatably coupled to an upper edge of the body portion by a second connection different from the first connection, such that moving the distal end of the instrument panel about the second connection moves the instrument panel to a second location outside the internal compartment and provides access into the storage compartment.

* * * * *